United States Patent
Shan et al.

(10) Patent No.: US 12,143,151 B1
(45) Date of Patent: Nov. 12, 2024

(54) SYSTEMS AND METHODS FOR FAST SEARCHING OF WIDEBAND IQ MODULATION IMAGE REJECTION

(71) Applicant: Hughes Network Systems, LLC, Germantown, MD (US)

(72) Inventors: Minheng Shan, Rockville, MD (US); Kumud Patel, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/306,002

(22) Filed: Apr. 24, 2023

(51) Int. Cl.
  *H04B 1/71* (2011.01)
  *H04B 1/719* (2011.01)
  *H04L 27/36* (2006.01)

(52) U.S. Cl.
  CPC ........... *H04B 1/719* (2013.01); *H04L 27/364* (2013.01)

(58) Field of Classification Search
  CPC ................................ H04B 1/719; H04L 27/364
  See application file for complete search history.

(56) References Cited

U.S. PATENT DOCUMENTS

| | | | | |
|---|---|---|---|---|
| 2010/0330929 A1* | 12/2010 | Heutmaker | ............... | H04B 1/30 455/73 |
| 2023/0269125 A1* | 8/2023 | Kim | ......................... | H03K 5/01 375/317 |
| 2024/0031085 A1* | 1/2024 | Horn | ..................... | H04L 5/0048 |

* cited by examiner

*Primary Examiner* — Dac V Ha
(74) *Attorney, Agent, or Firm* — Kilpatrick Townsend & Stockton LLP

(57) ABSTRACT

Devices, systems, methods, and non-transitory media facilitate image rejection for a radio frequency signal with a wideband carrier. Wideband signals from a device may be analyzed, the wideband signals corresponding to a wideband channel. Each wideband signal may correspond to a sinusoidal electrical signal with IQ amplitude and phase modulation. An in-phase component (I) of a wideband signal may be determined. A quadrature component (Q) of the wideband signal may be determined. Based on the determined I and Q, a wideband IQ imbalance may be determined. A scalar error based on the wideband IQ imbalance may be obtained. The scalar error may be mapped to a vector error plane. Orthogonal error vector points that are based on the mapping may be determined. The wideband IQ imbalance of the device may be compensated based on adjusting an IQ setting of the device with the orthogonal error vector points.

20 Claims, 20 Drawing Sheets

SYSTEMS AND METHODS FOR FAST SEARCHING OF WIDEBAND IQ MODULATION IMAGE REJECTION

TECHNICAL FIELD

This disclosure generally relates to high-speed satellite internet service, and more particularly to facilitating image rejection for a radio frequency signal with a wideband carrier.

BACKGROUND

When information is transferred over wireless networks, the signals may be at low frequencies. With voice communications, a voice codec may be used to digitize the voice so that the digitized voice may be transferred to another end of a channel via modulation with a radio frequency (RF) signal. A modulator may perform the modulation of the information with the signal. The signal may correspond to a sinusoid with angle modulation that has an in-phase component (I) and a quadrature component (Q)-amplitude-modulated sinusoids that are theoretically offset in phase by 90 degrees. However, in real use conditions, the offsets may often be not exactly 90 degrees. The IQ balance may be off, and the amplitude may also be off. That may create a problem in the transmission—viz., crosstalk (leakage). Image may be a measure of crosstalk, with units of dB. When image is greater, performance may be degraded on the receiver end. To reduce the crosstalk, the imbalances may be determined in order to make corrections at the modulator on the transmitter side (e.g., image suppression), performing channel equalization.

In the past, with satellite communications, the channel was often narrowband (e.g., 36 MHz wide). In such cases, the I and Q offsets could be measured. However, with a wideband carrier—e.g., 250 MHz-wide carrier, 500 MHz-wide carrier, 1,000 MHz-wide carrier—the IQ balance and amplitudes may vary more. Moreover, calibrating IQ modulation for image rejection may usually be time-consuming and may not reach the optimal point consistently.

Thus, there is a need for systems, methods, and processor-readable media that address the foregoing problems. This and other needs are addressed by the present disclosure.

BRIEF SUMMARY

Certain embodiments of the present disclosure relate generally to high-speed satellite internet service, and more particularly to facilitating image rejection for a radio frequency signal with a wideband carrier.

In one aspect, a device to facilitate image rejection for a radio frequency signal with a wideband carrier is disclosed. The device may include one or more processing devices and memory communicatively coupled with and readable by the one or more processing devices and having stored therein processor-readable instructions which, when executed by the one or more processing devices, cause the one or more processing devices to perform one or a combination of the following operations. One or more wideband signals from a device may be analyzed. The one or more wideband signals may correspond to a wideband channel. Each wideband signal of the one or more wideband signals may correspond to a sinusoidal electrical signal with IQ amplitude and phase modulation. The analyzing may include one or a combination of the following. An in-phase component (I) of at least one wideband signal of the one or more wideband signals may be determined. A quadrature component (Q) of the at least one wideband signal may be determined. Based at least in part on the determined I and Q, a wideband IQ imbalance of the at least one wideband signal may be determined. A scalar error based at least in part on the wideband IQ imbalance may be obtained. The scalar error may be mapped to a vector error plane. Orthogonal error vector points that are based at least in part on the mapping may be determined. The wideband IQ imbalance of the device may be compensated based at least in part on adjusting an IQ setting of the device with the orthogonal error vector points.

In another aspect, a method to facilitate image rejection for a radio frequency signal with a wideband carrier is disclosed. The method may include one or a combination of the following. One or more wideband signals from a device may be analyzed. The one or more wideband signals may correspond to a wideband channel. Each wideband signal of the one or more wideband signals may correspond to a sinusoidal electrical signal with IQ amplitude and phase modulation. The analyzing may include one or a combination of the following. An in-phase component (I) of at least one wideband signal of the one or more wideband signals may be determined. A quadrature component (Q) of the at least one wideband signal may be determined. Based at least in part on the determined I and Q, a wideband IQ imbalance of the at least one wideband signal may be determined. A scalar error based at least in part on the wideband IQ imbalance may be obtained. The scalar error may be mapped to a vector error plane. Orthogonal error vector points that are based at least in part on the mapping may be determined. The wideband IQ imbalance of the device may be compensated based at least in part on adjusting an IQ setting of the device with the orthogonal error vector points.

In yet another aspect, one or more non-transitory, machine-readable media are disclosed. The one or more non-transitory, machine-readable media may have machine-readable instructions thereon which, when executed by one or more processing devices, cause the one or more processing devices to perform one or a combination of the following operations. One or more wideband signals from a device may be analyzed. The one or more wideband signals may correspond to a wideband channel. Each wideband signal of the one or more wideband signals may correspond to a sinusoidal electrical signal with IQ amplitude and phase modulation. The analyzing may include one or a combination of the following. An in-phase component (I) of at least one wideband signal of the one or more wideband signals may be determined. A quadrature component (Q) of the at least one wideband signal may be determined. Based at least in part on the determined I and Q, a wideband IQ imbalance of the at least one wideband signal may be determined. A scalar error based at least in part on the wideband IQ imbalance may be obtained. The scalar error may be mapped to a vector error plane. Orthogonal error vector points that are based at least in part on the mapping may be determined. The wideband IQ imbalance of the device may be compensated based at least in part on adjusting an IQ setting of the device with the orthogonal error vector points.

In various embodiments, the orthogonal error vector points may be four orthogonal error vector points. In various embodiments, the orthogonal error vector points may be two orthogonal error vector points. In various embodiments, the mapping the scalar error to the vector error plane may include determining extreme IQ errors. In various embodiments, the extreme IQ errors comprise one or more gain errors and/or one or more phase errors.

In various embodiments, error vector components may be calculated based at least in part on the orthogonal error vector points. One or more IQ compensation parameters may be determined based at least in part on the error vector components. The compensating for the wideband IQ imbalance may be based at least in part on the one or more IQ compensation parameters. In various embodiments, the determining the wideband IQ imbalance of the at least one wideband signal may include determining an IQ imbalance at a center frequency of the at least one wideband signal and determining an IQ imbalance at one or more edge frequencies of the at least one wideband signal.

In various embodiments, the wideband signal may be modulated to convert to a radio frequency domain, and modulator performance metrics may be determined. In various embodiments, the determining the wideband IQ imbalance of the at least one wideband signal may correspond to measuring IQ balance across an entire bandwidth of the at least one wideband signal. In various embodiments, equalization coefficients may be derived, the compensating for the wideband IQ imbalance of the device may include using the equalization coefficients to correct the wideband channel, and the correcting the wideband channel may include reducing imaging of the channel. In various embodiments, based at least in part on the compensating for the wideband IQ imbalance of the device, the wideband channel may be equalized so that broadband and narrowband are equalized by way of the wideband channel being equalized. The wideband channel may be an ultra-wideband channel.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
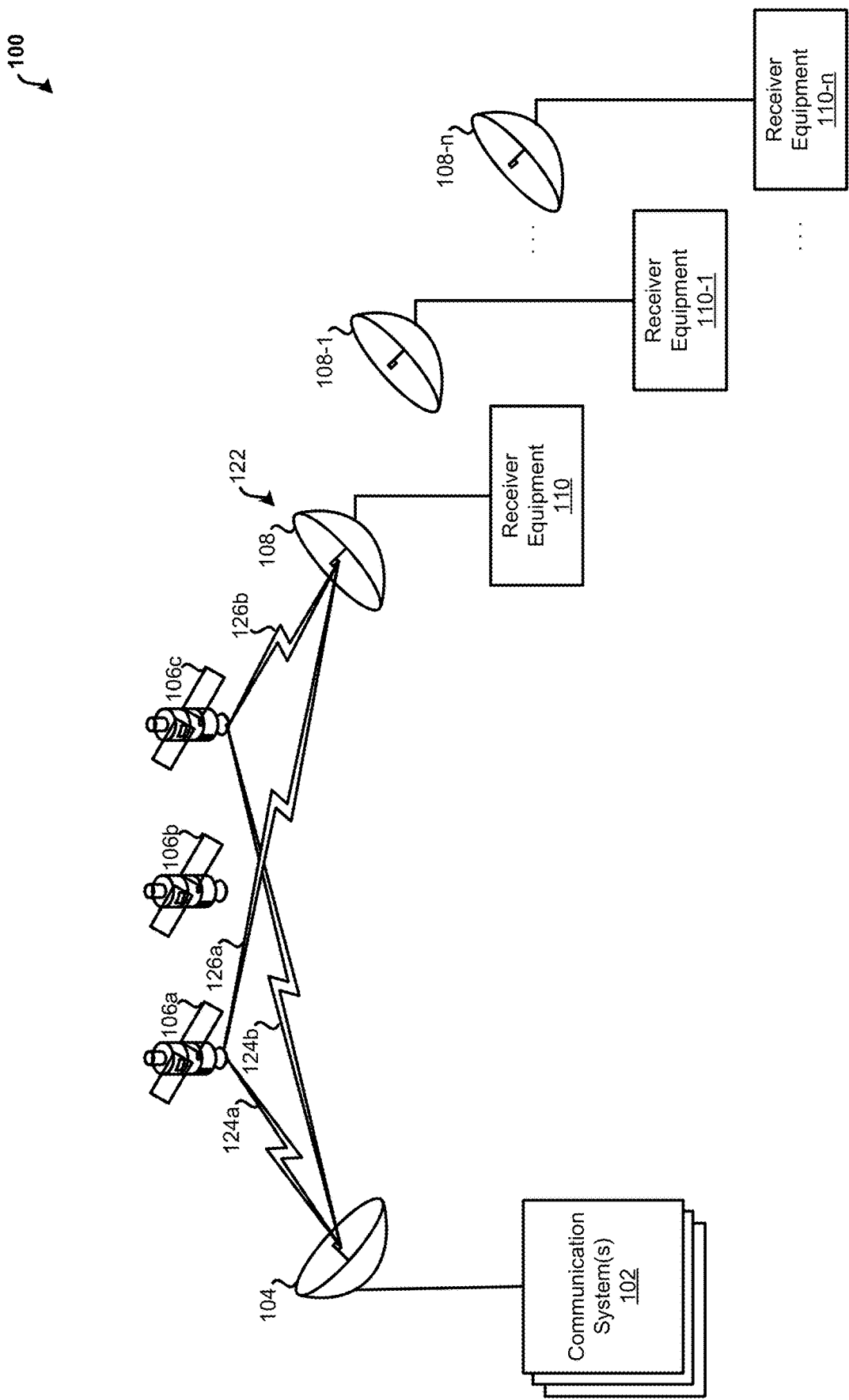
FIG. 1 illustrates an exemplary high-speed satellite internet service system, in accordance with disclosed embodiments of the present disclosure.

FIG. 1 shows an exemplary high-speed satellite internet service system 100 in which aspects of the present disclosure may be implemented. However, while the system 100 is provided as one example, aspects of the present disclosure may be implemented in other systems and environments where wideband RF communications are used. For brevity, the system 100 is depicted in a simplified and conceptual form, and may generally include more or fewer systems, devices, networks, and/or other components as desired. Further, number and type of features or elements incorporated within the system 100 may or may not be implementation-specific.

The system 100 may include a communication system 102, a satellite network 122 (which may include a satellite uplink 104, a plurality of satellites 106a-c, a satellite dish 108, etc.), and receiver equipment 110. The system 100 may facilitate communications for data transfer between the communication system 102 and the receiver equipment 110. In various embodiments, the communications may be bidirectional and may, for example, provide for satellite Internet access by way of the satellite network 122. The system 100 is intended to represent any number of terrestrial and/or non-terrestrial network features or elements.

The receiver equipment 110 may include any suitable devices configured to receive communications from the satellite network 122. For example, receiver equipment 110 may include or otherwise correspond to one or a combination of routers, gateways, servers, radio towers, radio devices, content receivers, television receivers, end-user devices, desktop computers, laptop computers, smartphones, tablets, wearable devices, other mobile devices, televisions, wide area networks (WANs), home area networks (HANs), local area networks (LANs), wireless-local area networks (W-LANs), and/or the like.

In practice, the satellites 106a-c may each be configured to receive uplink signals (e.g., 124a, 124b, etc.) from the satellite uplink 104. In some examples, each of the uplink signals may contain one or more transponder streams of particular data or content, such as one or more particular television channels, as supplied by the communication system 102. For example, each of the respective uplink signals may contain various content such as encoded High-Definition television channels, Standard Definition television channels, on-demand programming, programming information, and/or any other content in the form of at least one transponder stream, and in accordance with an allotted carrier frequency and bandwidth. In this example, different content may be carried using different ones of the satellites 106a-c. However, the uplink signals may include any other suitable types of digital communications, including voice communications and other data communications.

The satellites 106a-c may further be configured to relay the uplink signals (i.e., 124a, 124b) to the satellite dish 108 as downlink signals (represented as 126a, 126b). Similar to the uplink signals, each of the downlink signals may contain one or more transponder streams of particular data or content, such as various encoded and/or at least partially electronically scrambled television channels, on-demand programming, etc., in accordance with an allotted carrier frequency and bandwidth. The downlink signals, however, may not necessarily contain the same or similar content as a corresponding one of the uplink signals. The satellite dishes 108 may be provided for use to receive digital communications provided by the communication system 102, satellite uplink 104, and/or satellites 106a-c. For example, the satellite dish 108 may be configured to receive particular transponder streams, or downlink signals e.g., 126a or 126b, from one or more of the satellites 106a-c.

In a traditional case, a transmitter for the communications provided by way of satellite is narrowband (e.g., 36 MHz). With narrowband, single-point calibration may be sufficient. However, the system 100 may provide for wideband communications with a wideband carrier. For example, the carrier may be a 250 MHz-wide carrier, a 500 MHz-wide carrier, a 1,000 MHz-wide carrier, etc. The offsets can vary greatly across wideband, relative to narrowband.

The system 100 and the methods disclosed herein may provide for determining and characterizing wideband imbalances, and then pre-compensating for the imbalances so there is no IQ interference due to the IQ not being 90 degrees off. Disclosed embodiments may provide for channel equalization based at least in part on fast and consistently accurate calibration of IQ modulation for image rejection with wideband, and across the entire band, rather than for a single point. This may include fast search methods with a spectrum analyzer for IQ modulation image rejection. Disclosed embodiments may provide for faster searching for, and identification of, the optimal point in vector by scaler spectrum analyzer measurements. Disclosed embodiments may track the errors of a channel, characterize the channel, calculate to derive accurate corrections (e.g., equalization coefficients), then use the corrections in the data modulation and processing to correct the channel, reducing crosstalk/imaging (e.g., image suppression).

Figure 2:
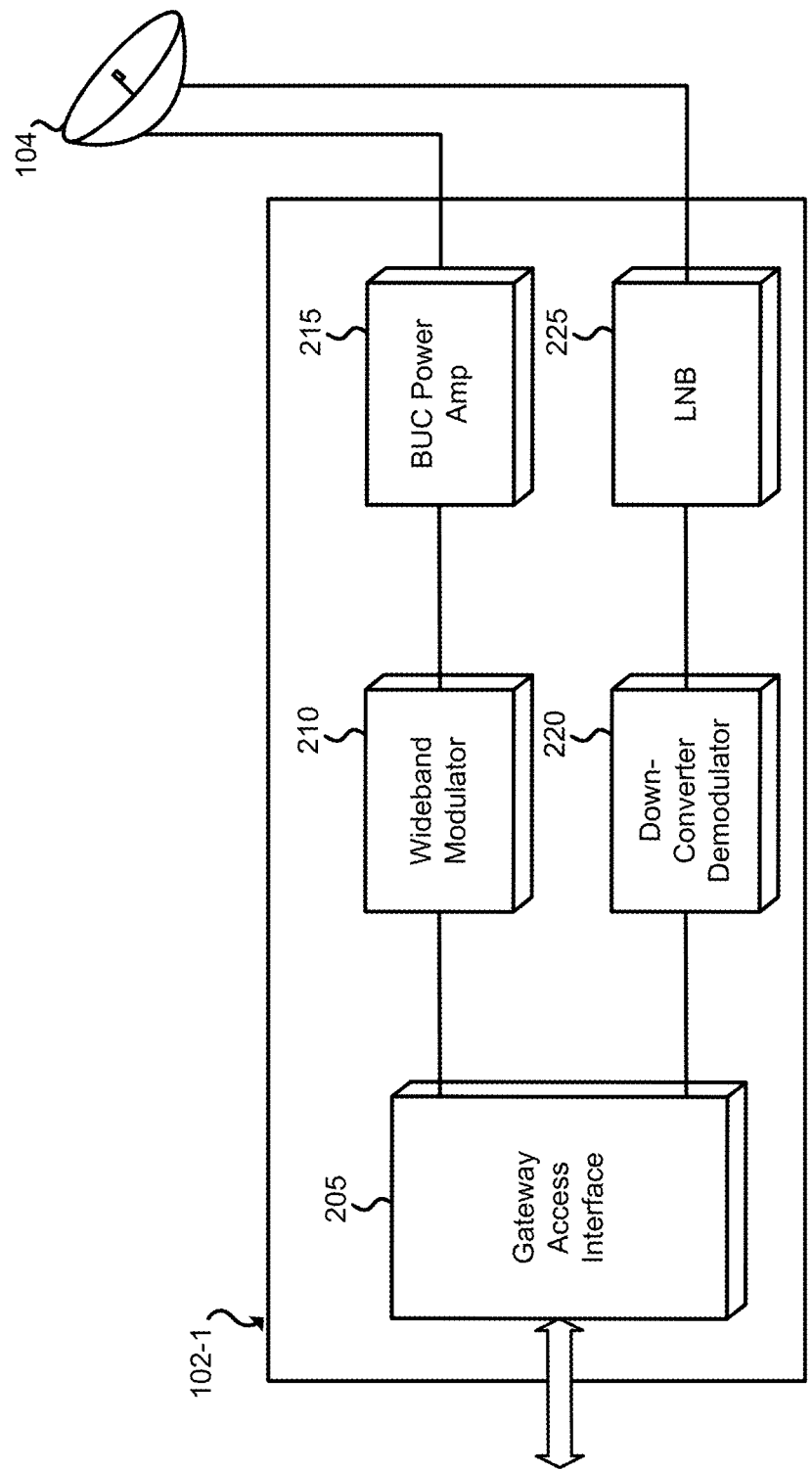
FIG. 2 illustrates an example block diagram of some aspects of one example communication system, in accordance with disclosed embodiments of the present disclosure.

FIG. 2 illustrates a block diagram of some aspects of one example communication system 102-1, in accordance with disclosed embodiments according to the present disclosure. In some embodiments, the communication system 102-1 may include or otherwise correspond to a gateway. Other embodiments are possible. For brevity, the communication system 102-1 is depicted in a simplified form, and various embodiments of communication system 102-1 may generally include more and/or different components to implementing various features of the embodiments.

The communication system 102-1 may include a gateway interface 205, a wideband modulator 210, a block up converter (BUC) power amplifier 215, a downconverter demodulator 220, a low-noise block downconverter (LNB) 225, and/or the like. The gateway may provide access to the communication system 102-1 for various communication devices to send and receive communications via the satellite uplink 104. The communication devices may include or otherwise correspond to one or a combination of routers, other gateways, servers, radio towers, radio devices, content receivers, television receivers, end-user devices, desktop computers, laptop computers, smartphones, tablets, wearable devices, other mobile devices, televisions, WANs, HANS, LANs, W-LANs, and/or the like. The LNB 225 and the downconverter demodulator 220 may correspond to the receiver branch of the communication system 102-1 configured to receive signals from the satellite uplink 104. The wideband modulator 210 and the BUC power amplifier 215 may correspond to the transmitter branch of the communication system 102-1 configured to send signals to the satellite uplink 104.

The transmissions may have IQ imbalances. Transmitter-induced, frequency-independent IQ imbalance may be caused by non-idealities in the local oscillators, mixers, passives, and differential pair wiring of the transmitter which cause the in-phase and quadrature components of the modulator to be non-orthogonal. As a result, the real and imaginary components of the complex signal may interfere with each other, which can increase the bit error rate of the communications system, if not properly accounted for. However, this hardware impairment can also be used to identify emitters, as emitters with differing levels of IQ imbalance may alter transmissions with different intensities.

Figure 3:
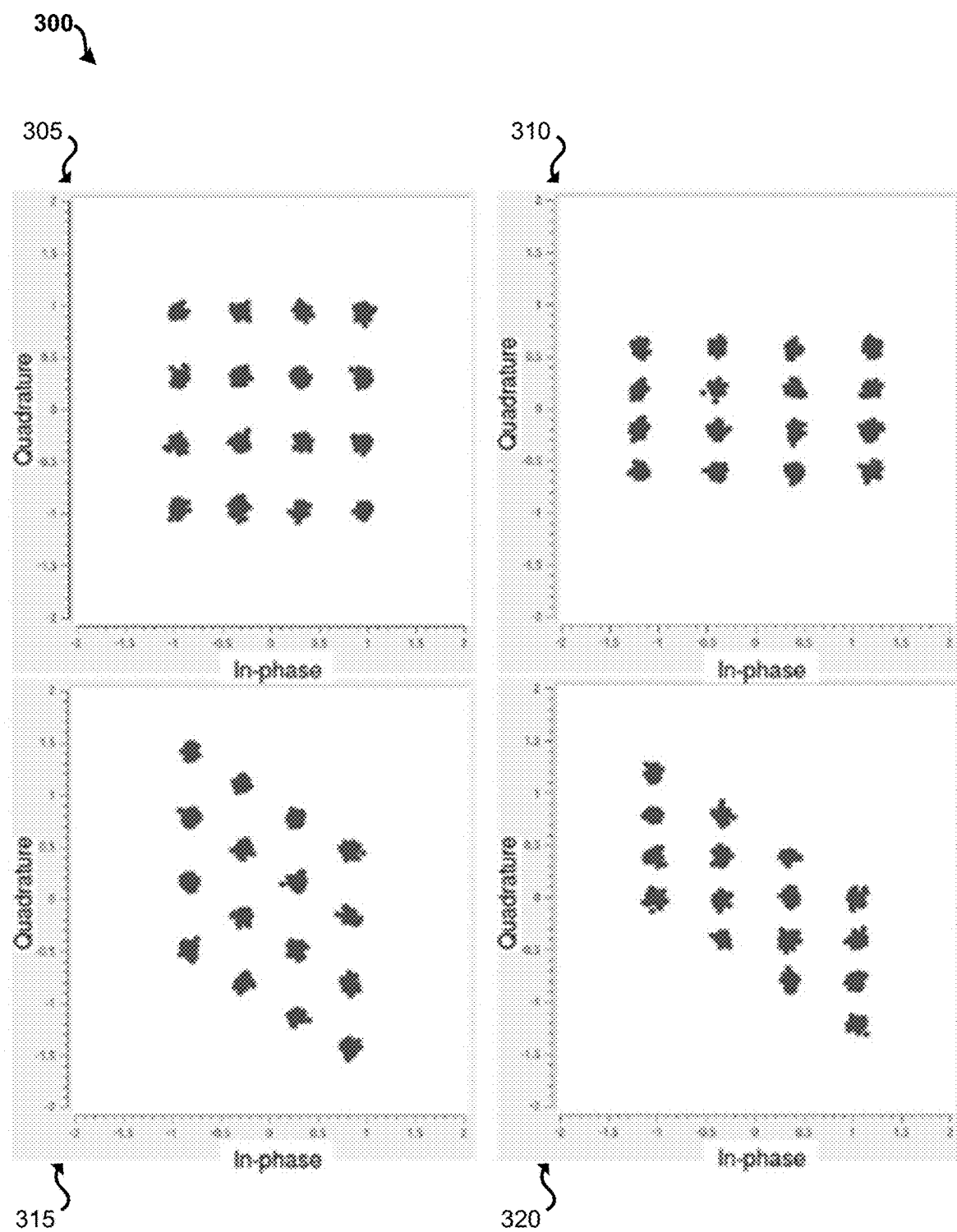
FIG. 3 illustrates an example result of IQ imbalance in a real component of a signal in constellation diagrams, with exaggerated imbalance values for clarity.

By way of example, FIG. 3 illustrates an example result of IQ imbalance in a real component of a 16QAM signal in constellation diagrams 300, with exaggerated imbalance values for clarity. When a signal is decoded, the signal may be decoded into 16 decoding points, represented by the constellations. Constellation 305 shows the ideal case with no imbalances. The other constellations show different imbalances, which may be equalized in accordance with disclosed embodiments so that they are compensated in order to achieve the ideal state of constellation 305. Constellation 310 shows a gain imbalance of 0.9 and a phase imbalance of 0. Constellation 315 shows a phase imbalance of 30° and a gain imbalance of 0. Constellation 320 shows a phase imbalance of 30° and a gain imbalance of 0.9. Thus, a phase imbalance results in the rotation of the real component of the symbols. Meanwhile, a gain imbalance results in the stretching or contracting of the real component of the symbols.

The IQ image signal caused by IQ imbalance of the modulator may be thoroughly analyzed, and the correlation between the vector IQ imbalance of the modulator and the scaler measurement of spectrum analyzer may be constructed. An error vector plane of IQ imbalance combined with the gain adjustment and phase offset may be created to structure the fast search in a vector way. Disclosed embodiments may dramatically reduce the test time and achieve a stable result for the IQ compensation and equalization.

In a real communication system, especially with ultra-wide band communication, the amplitude and phase imbalance may vary across the frequency band. This may require a complex equalizer to compensate. In an ultra-wide band system, the equalizer may be configured for each narrow band signal or for the whole wideband channel. The communication system 102 may be configured to perform the whole ultrawide band channel equalization with an equalizer that addresses the needs for compensation.

Figure 4:
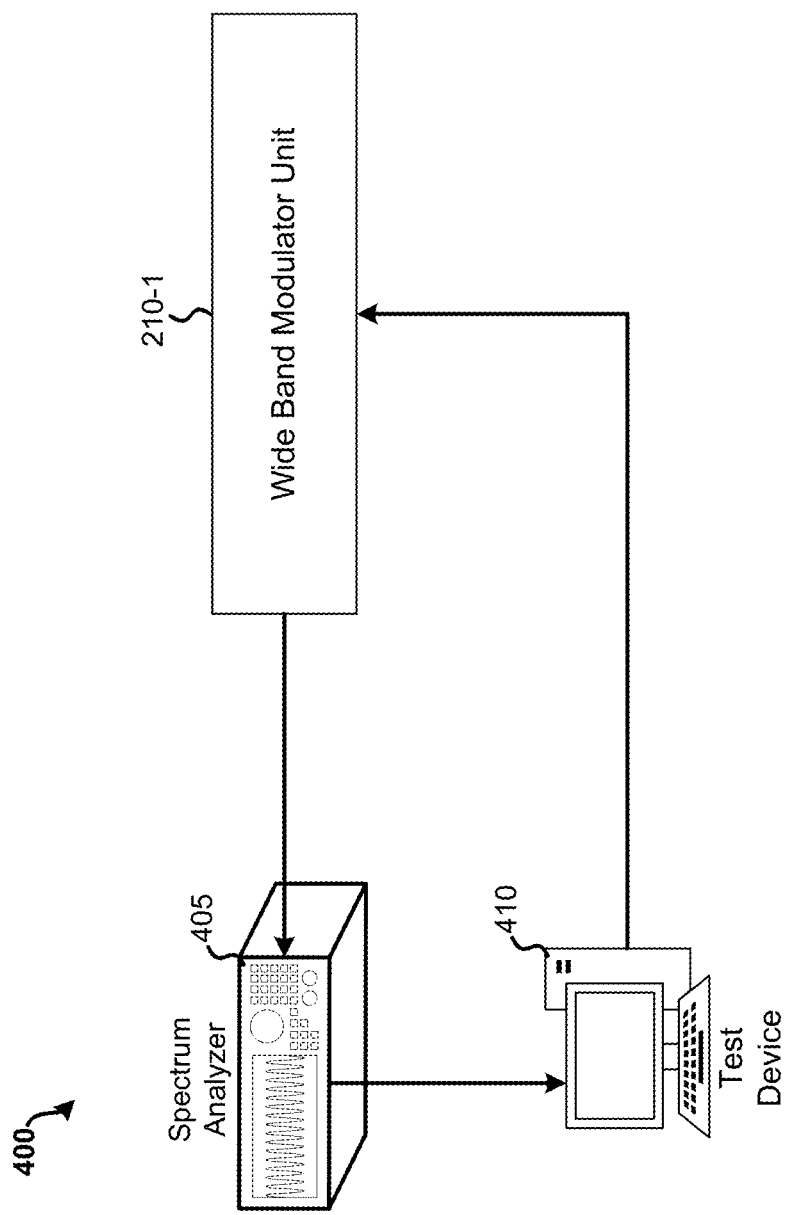
FIG. 4 illustrates an example simplified diagram of a wideband modulator calibration test setup, in accordance with disclosed embodiments of the present disclosure.

Various methods may be performed by the communication system 102, as disclosed herein. FIG. 4 illustrates an example simplified diagram of a wideband modulator calibration test setup 400. The test setup 400 may include wideband modulator unit 210, a spectrum analyzer 405, and a test computing device 410. Although depicted separately for illustration, various embodiments may include such features integrated within the communication system 102 and/or components thereof.

To generate wide band equalization, the whole channel may be characterized by the communication system 102. Such characterization may include characterizing all the variances of the channel, which may include differences in phase and gain, signals that vary in shape, and/or the like that vary depending on the frequency. A channel frequency response may be obtained that includes the amplitude information and the phase information. However, a spectrum analyzer 405 may display only amplitude information. Conventional signal analyzers (e.g., basic spectrum analyzers) have bandwidth limitations such that they cannot be used to analyze the whole ultra-wideband channel.

The disclosed embodiments, however, may allow for the whole ultra-wideband channel analysis and equalization, with the IQ environment, calculations, etc. disclosed herein. Disclosed embodiments may provide for obtaining the phase imbalance information. Obtaining accurate amplitude and phase imbalance measurements may affect the equalizer performance. To characterize the whole wideband channel, the communication system 102 may measure the IQ amplitude and phase imbalance, DC offset in frequency domain with a spectrum analyzer 405. The spectrum analyzer may be scaler measurement device. Disclosed herein is an algorithm and procedure to quickly measure the IQ imbalance in the spectrum analyzer.

Figure 5:
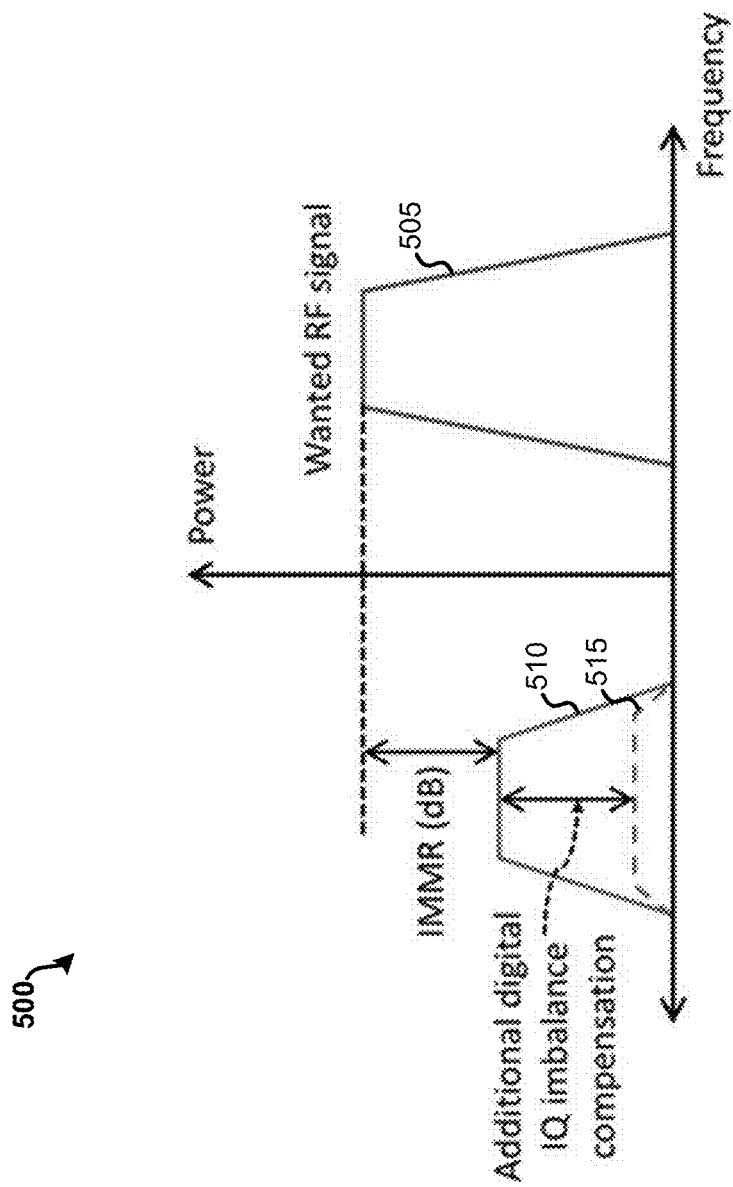
FIG. 5 illustrates a graph with examples to demonstrate the effect of IQ compensation to improve the IMMR in the spectrum domain, in accordance with disclosed embodiments of the present disclosure.

FIG. 5 is a graph 500 that illustrates examples a graph with examples to demonstrate the effect of IQ compensation to improve the IMMR in the spectrum domain, in accordance with disclosed embodiments of the present disclosure. Illustrated is a desired RF signal 505 in power and frequency, as well as an image 510, with a corresponding image rejection ratio (IMMR), that needs to be suppressed with additional digital IQ imbalance compensation to a minimized state 515, or further to be eliminated down to the optimal point (which may correspond to zero offset). In order to do that, in a scalar environment, disclosed embodiments may perform vector searching which accelerates the searching to reach the optimal point. With conventional methods, the searching may require many time-consuming iterations (e.g., 50 or more). With methods disclosed herein, the searching may be 10 times faster or more with fewer iterations to reach the optimal point (e.g., three or less).

Figure 6:
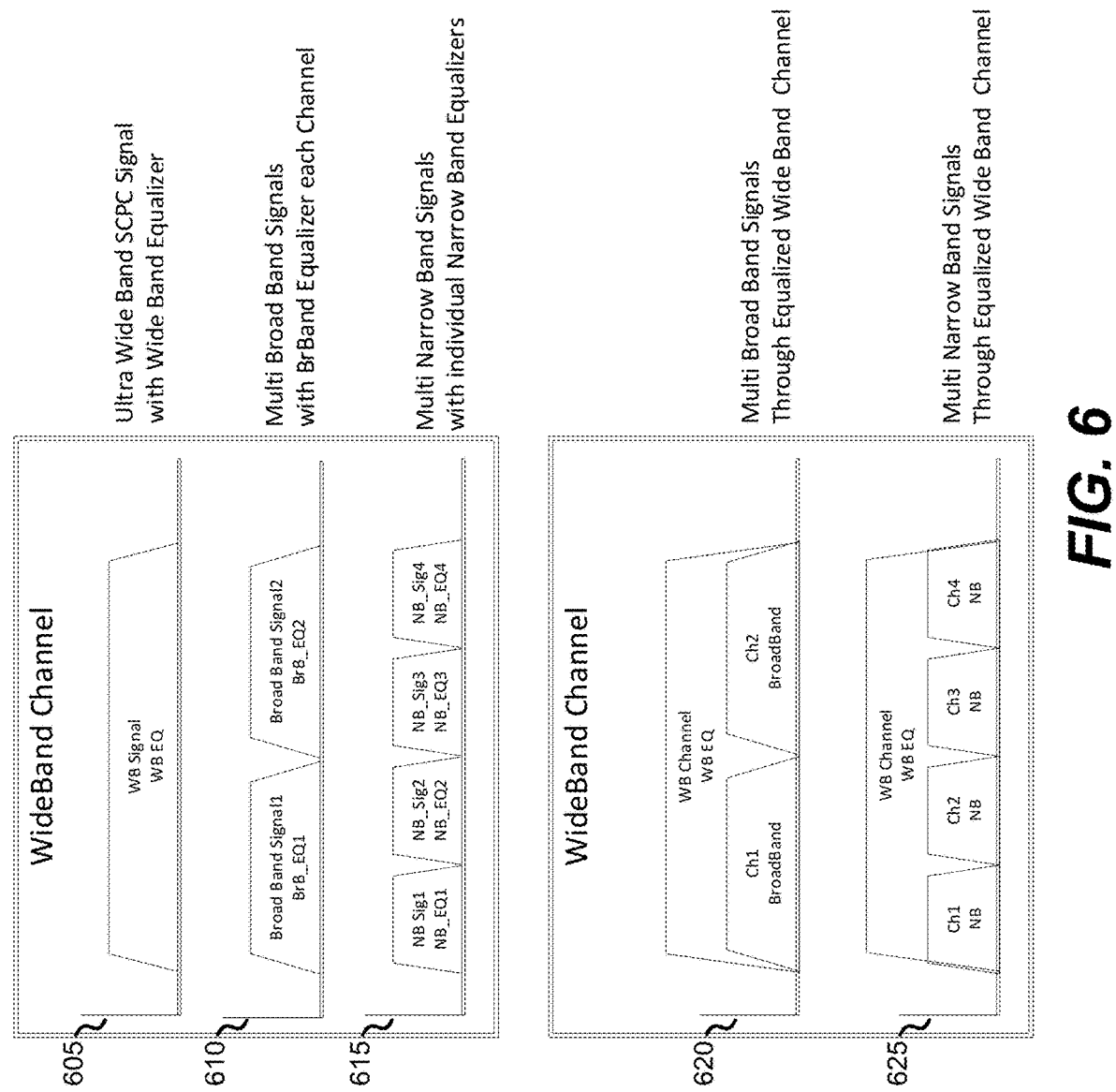
FIG. 6 illustrates some aspects of wideband channel equalization, in accordance with disclosed embodiments of the present disclosure.

FIG. 6 illustrates some aspects of wideband channel equalization, in accordance with disclosed embodiments. When performing testing and other operations, disclosed embodiments may have an ultra-wide band channel, which, as disclosed herein, may be for satellite communications or other wireless communications. The signal representations 605, 610, 615 may correspond to how each separate carrier must be equalized separately, whether the carrier be ultra-wideband, broadband, or narrowband. The signal representations 620, 625 may correspond to how whole ultra-wide band channel may be equalized such that broadband and narrowband are equalized by way of the entire ultra-wide band channel being equalized.

Indicated by 605 is a representation of an ultra-wideband single channel per carrier (SCPC) signal, which would require a wideband equalizer for the channel. Indicated by 610 is a representation of multiple broadband signals that would require a broadband equalizer for each channel. Indicated by 615 is a representation of multiple narrowband signals that would require an individual narrowband equalizer for each channel. In a traditional system, a transponder may have a 36 MHz, or other smaller frequency, channel. Each carrier may have a single equalization to ensure that it may be equalized toward the ideal signal.

However, in disclosed embodiments, instead of each carrier doing the individual equalization, the whole ultra-wide band may be equalized. Indicated by 620 is a representation of multiple broadband signals through an equalized wideband channel. Indicated by 625 is a representation of multiple narrowband signals throughout equalized wideband channel. So, internally, carriers may be broadband carriers as indicated by 620 and/or narrowband carriers as indicated by 625 that are equalized by virtue of the entire channel being equalized. To do the ultra-wideband equalization, initially, only the spectrum may be available; that is a scalar system that may only give amplitude information. Vector information may not be available at that time.

Figure 7:
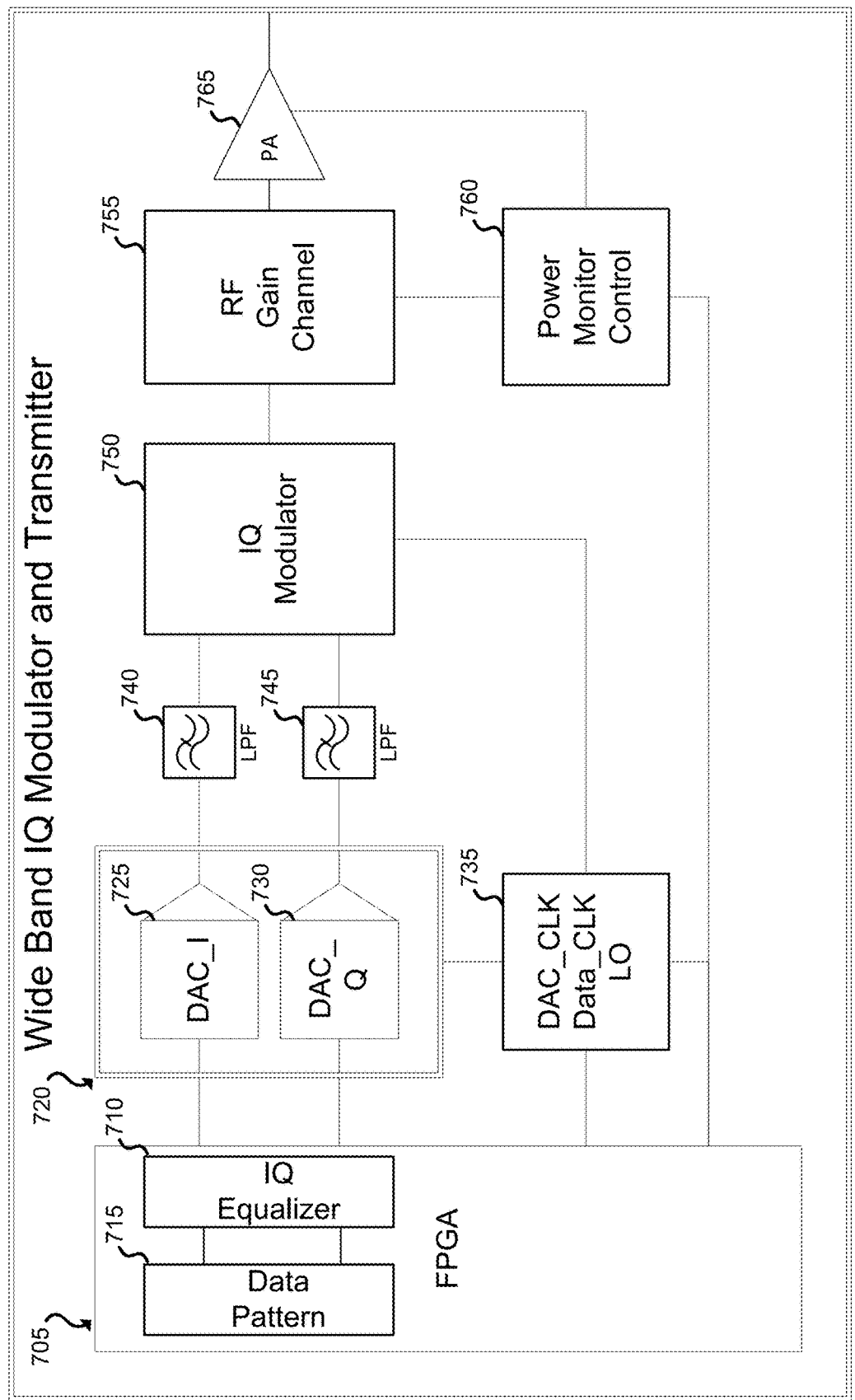
FIG. 7 illustrates an example block diagram of a wideband modulator, in accordance with disclosed embodiments of the present disclosure.

FIG. 7 illustrates an example block diagram of the wideband modulator 210-1, in accordance with disclosed embodiments according to the present disclosure. For brevity, the wideband modulator 210-1 is depicted in a simplified form, and various embodiments of the wideband modulator 210-1 may generally include more and/or different components to implementing various features of the embodiments.

The wideband modulator 210-1 may correspond to a wideband IQ modulator and transmitter and may include one or a combination of a field-programmable gate array (FPGA) 705, an IQ equalizer 710, a data pattern engine 715, a digital-to-analog converter (DAC) 720, a DAC 725 configured for the I component, a DAC 730 configured for the Q component, a local oscillator (LO) and clock component 735, low-pass filters 740 and 745, an IQ modulator 750, an RF gain channel component 755, a power monitor and controller 760, a power amplifier 765, and/or the like. The IQ equalizer 710 may correspond to an IQ imbalance compensator that may be in a data path before the DAC 720.

Figure 8:
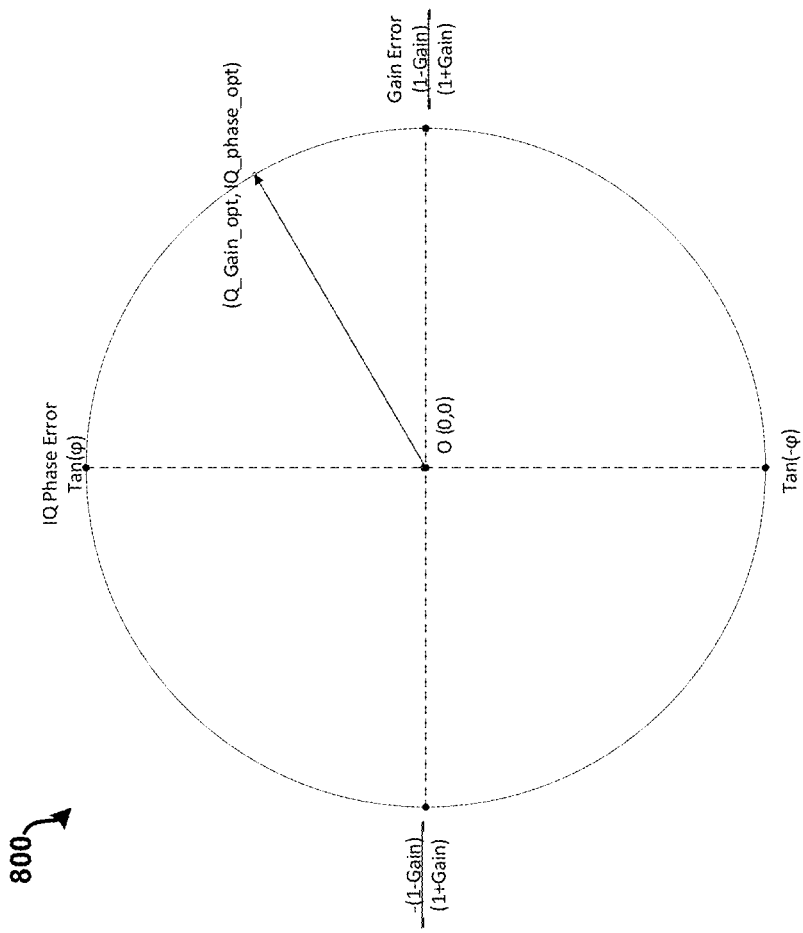
FIG. 8 illustrates an example vector search plot, in accordance with disclosed embodiments of the present disclosure.

In practice, the image rejection calibration may need to adjust the IQ gain and the IQ phase to find the optimum point to get the lowest image level on the spectrum. FIG. 8 illustrates an example vector search plot 800, in accordance with disclosed embodiments according to the present disclosure. The new method may correlate the spectrum feedback image level to a vector amplitude on an orthogonal plane of IQ modulation gain error and phase error, then may perform a vector search to predict the optimum point. With disclosed embodiments, this search may be repeated in case measurement error still causes residual imbalance. This method may rapidly find the optimum points, suppressing the image signal from −30 dBc to below −90 dBc in one or more rounds of searching.

Figure 9:
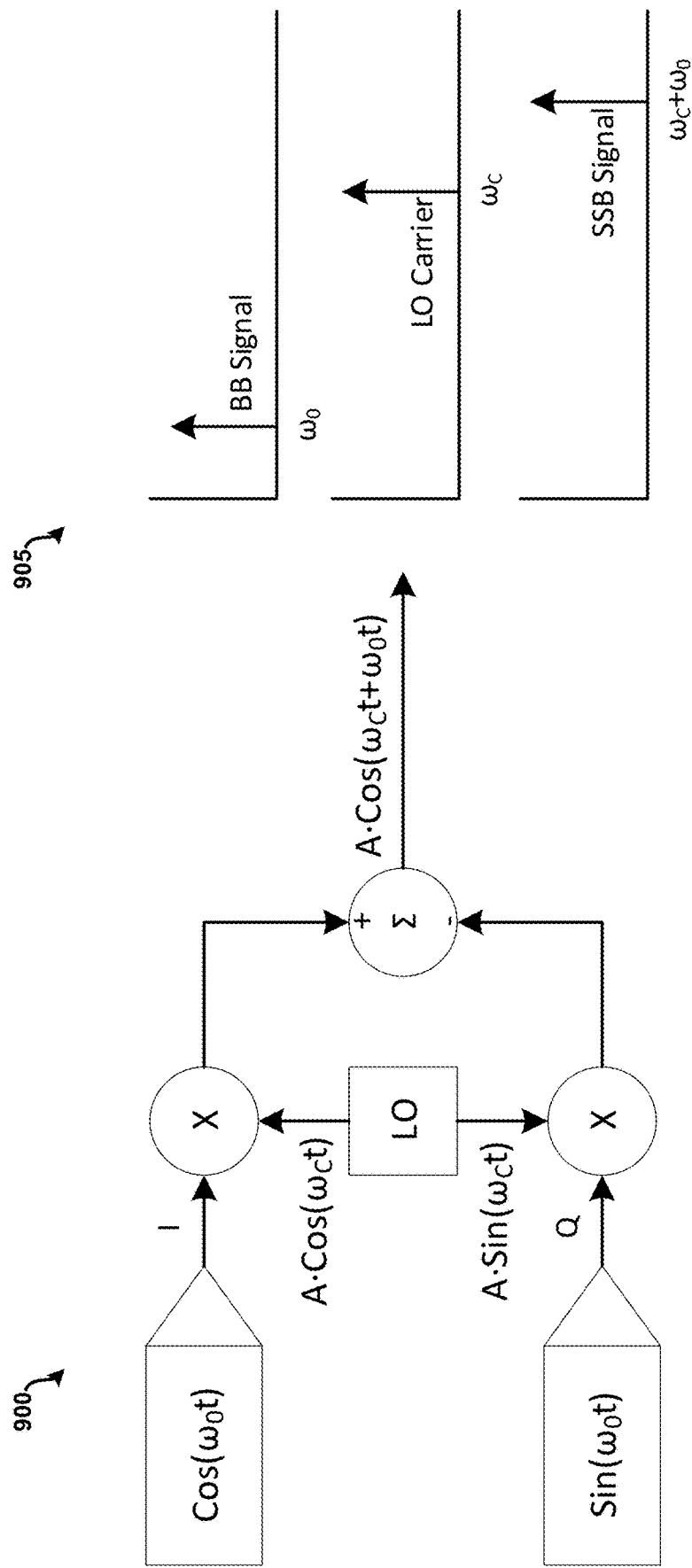
FIG. 9 illustrates a baseband tone passes an IQ modulator and its output, in accordance with disclosed embodiments of the present disclosure.

In modern digital communication system, IQ modulation may be used to create digital modulation constellation. The baseband spectrum may be shifted-up to the LO frequency. FIG. 9 illustrates a baseband tone passes 900 the IQ modulator and what its output 905 should be, where:

$$\text{Cos}(\omega_0 t) \cdot A \cdot \text{Cos}(\omega_c t) - \text{Sin}(\omega_0 t) \cdot A \cdot \text{Sin}(\omega_c t) = A \cdot \text{Cos}(\omega_c t + \omega_0 t).$$

Figure 10:
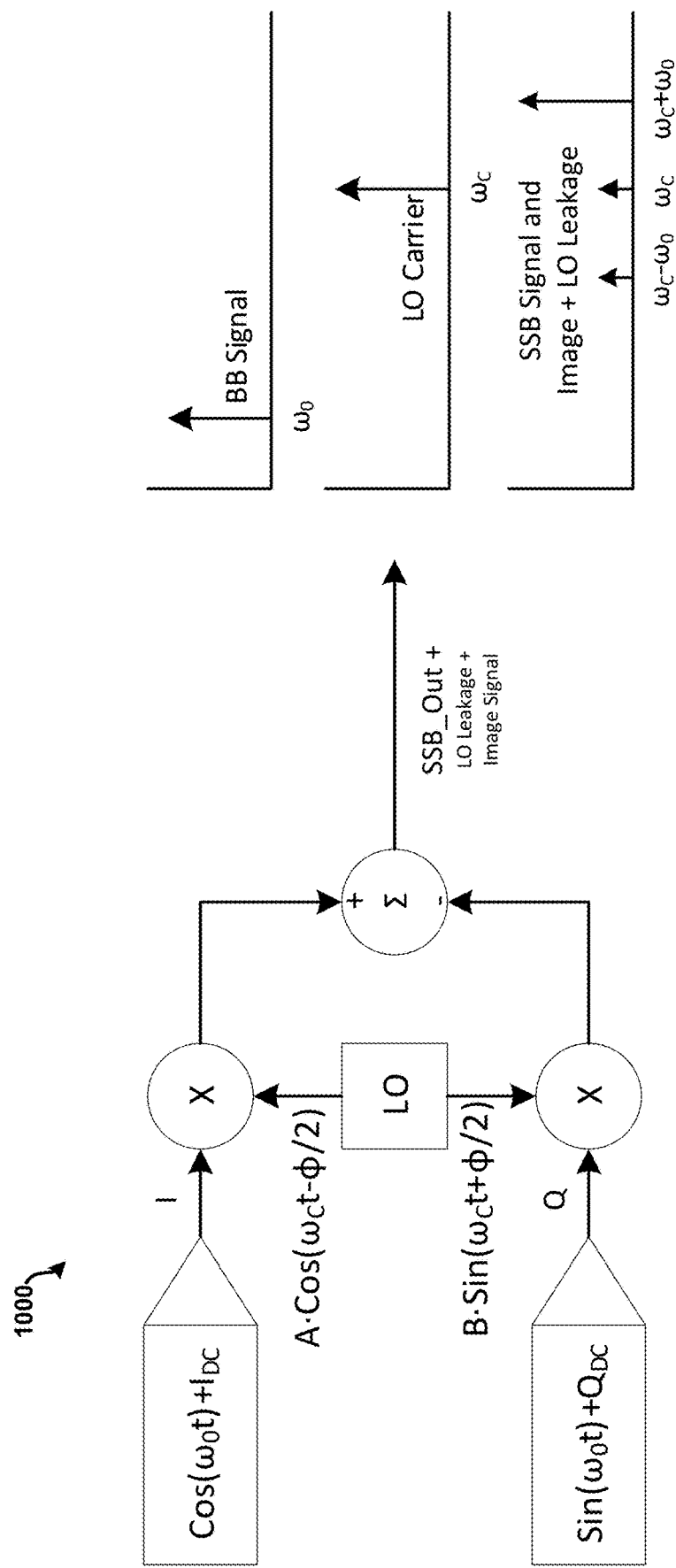
FIG. 10 illustrates an example result of imbalanced amplitude and phase, in accordance with disclosed embodiments of the present disclosure.

In reality, non-idealities may cause imbalanced amplitude and phase, and the image signal as well as LO leakage may show in the output spectrum. FIG. 10 illustrates an example result 1000 of the imbalanced amplitude and phase, where, focusing on the image part of the leakage:

$$\text{Output} = \text{Cos}(\omega_0 t) \cdot A \cdot \text{Cos}\left(\omega_c t - \frac{\varphi}{2}\right) - \text{Sin}(\omega_0 t) \cdot B \cdot \text{Sin}\left(\omega_c t + \frac{\varphi}{2}\right) =$$

$$\frac{A+B}{2} \cdot \text{Cos}\left(\frac{\varphi}{2}\right)\left(\text{Cos}(\omega_c t + \omega_0 t) + \frac{A-B}{A+B} \cdot \text{Cos}(\omega_c t - \omega_0 t) + \right.$$

-continued
$$\left. \text{Tan}\left(\frac{\varphi}{2}\right)\text{Sin}(\omega_c t - \omega_0 t) + \frac{A-B}{A+B} \cdot \text{Tan}\left(\frac{\varphi}{2}\right)\text{Sin}(\omega_c t + \omega_0 t)\right)$$

This shows two output frequencies ($\omega_c t + \omega_0 t$) and ($\omega_c t - \omega_0 t$) that will show at the output. The wanted output may be called the single sideband modulation (SSB) signal ($\omega_c t + \omega_0 t$), where:

$$SSB(\omega_c t + \omega_0 t) \text{ Signal} =$$

$$\frac{A+B}{2} \cdot \text{Cos}\left(\frac{\varphi}{2}\right)\left(\text{Cos}(\omega_c t + \omega_0 t) + \frac{A-B}{A+B} \cdot \text{Tan}\left(\frac{\varphi}{2}\right)\text{Sin}(\omega_c t + \omega_0 t)\right) =$$

$$\frac{\sqrt{A^2 + 2AB \cdot \text{Cos}(\varphi) + B^2}}{2} \cdot \text{Cos}\left(\omega_c t + \omega_0 t - \arctan\left(\frac{A-B}{A+B} \cdot \text{Tan}\left(\frac{\varphi}{2}\right)\right)\right)$$

The unwanted output may be called the Image ($\omega_c t - \omega_0 t$), where:

$$\text{Image}(\omega_c t - \omega_0 t) \text{ Signal} =$$

$$\frac{A+B}{2} \cdot \text{Cos}\left(\frac{\varphi}{2}\right)\left(\frac{A-B}{A+B} \cdot \text{Cos}(\omega_c t - \omega_0 t) + \text{Tan}\left(\frac{\varphi}{2}\right)\text{Sin}(\omega_c t - \omega_0 t)\right).$$

When $A \approx B$ and $\varphi \ll 1$, the $\text{Sin}(\omega_c t + \omega_0 t)$ part can be omitted. Then, $$SSB \text{ amplitude} \approx \frac{A+B}{2} \cdot \text{Cos}\left(\frac{\varphi}{2}\right)$$

and $$\text{Image}(\omega_c t - \omega_0 t) \text{ Signal Amplitude relative to } SSB \text{ Level} =$$

$$\sqrt{\left(\frac{A-B}{A+B}\right) + \left(\left(\text{Tan}\left(\frac{\varphi}{2}\right)\right)\right)^2}.$$

The non-ideal general case plus the image rejection may be given by:

$$\text{Output} = \text{Cos}(\omega_0 t) + \text{Tan}(\theta)\text{Sin}(\omega_0 t)) \cdot A \cdot \text{Cos}\left(\omega_c t - \frac{\varphi}{2}\right) -$$

$$Q \cdot \text{Sin}(\omega_0 t) \cdot B \cdot \text{Sin}\left(\omega_c t + \frac{\varphi}{2}\right) = \frac{A}{\text{Cos}(\theta)} \cdot$$

$$\frac{e^{j(\omega_c t + \omega_0 t - \theta - \frac{\varphi}{2})} + e^{-j(\omega_c t + \omega_0 t - \theta - \frac{\varphi}{2})} + e^{j(\omega_c t - \omega_0 t - \frac{\varphi}{2})} + e^{-j(\omega_c t - \omega_0 t + \theta - \frac{\varphi}{2})}}{4} +$$

$$BQ \frac{e^{j(\omega_c t + \omega_0 t + \frac{\varphi}{2})} + e^{-j(\omega_c t + \omega_0 t + \frac{\varphi}{2})} - e^{j(\omega_c t - \omega_0 t + \frac{\varphi}{2})} - e^{-j(\omega_c t - \omega_0 t + \frac{\varphi}{2})}}{4}$$

$$SSB \text{ Component} = \frac{A}{\text{Cos}(\theta)} \cdot \frac{e^{j(\omega_c t + \omega_0 t - \theta - \frac{\varphi}{2})} + e^{-j(\omega_c t + \omega_0 t - \theta - \frac{\varphi}{2})}}{4} +$$

$$BQ \cdot \frac{e^{j(\omega_c t + \omega_0 t + \frac{\varphi}{2})} + e^{-j(\omega_c t + \omega_0 t + \frac{\varphi}{2})}}{4}$$

$$\text{Image Component} = \frac{A}{\text{Cos}(\theta)} \cdot \frac{e^{j(\omega_c t - \omega_0 t + \theta - \frac{\varphi}{2})} + e^{-j(\omega_c t - \omega_0 t + \theta - \frac{\varphi}{2})}}{4} -$$

$$BQ \cdot \frac{e^{j(\omega_c t - \omega_0 t + \frac{\varphi}{2})} + e^{-j(\omega_c t - \omega_0 t + \frac{\varphi}{2})}}{4}$$

-continued

Let $\theta = \varphi$, then Image Component =

$$\frac{1}{2}\left(\frac{A}{\cos(\varphi)} - BQ\right) \cdot \frac{e^{j(\omega_C t - \omega_0 t + \frac{\varphi}{2})} + e^{-j(\omega_C t - \omega_0 t + \frac{\varphi}{2})}}{2} \text{ and let } \frac{A}{\cos(\varphi)} = BQ,$$

then Image Component = $\frac{0}{2} \cdot \cos\left(\omega_C t - \omega_0 t + \frac{\varphi}{2}\right)$ gets canceled out.

Figure 11:
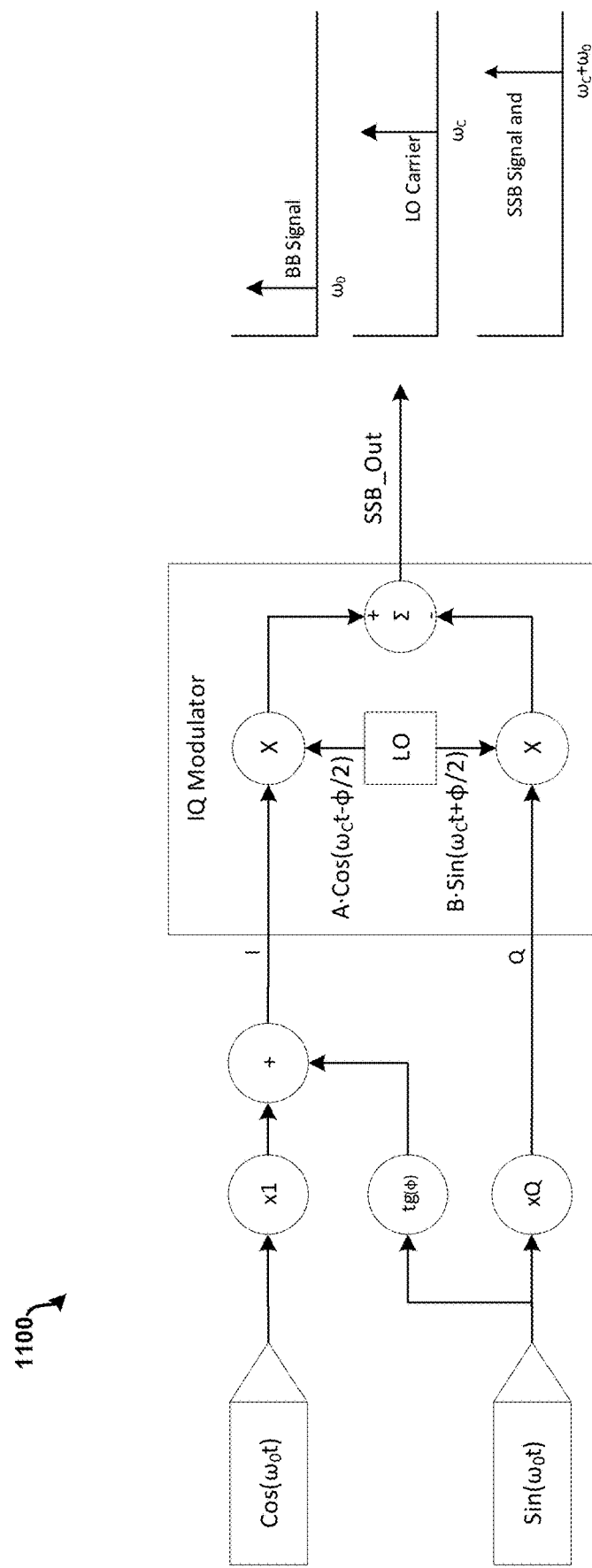
FIG. 11 illustrates an IQ imbalance compensator inserted in the data path before an IQ modulator, in accordance with disclosed embodiments of the present disclosure.
Figure 12:
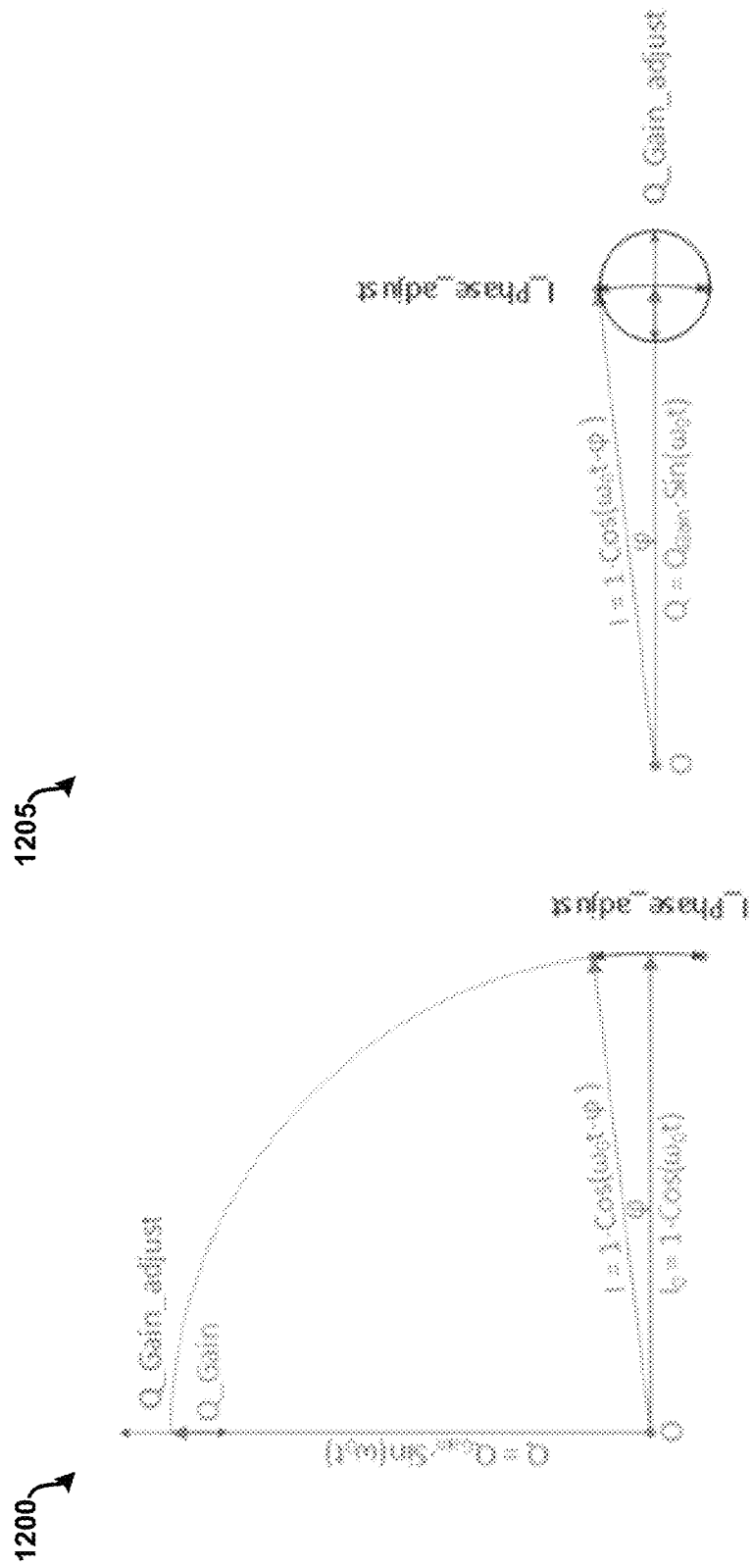
FIG. 12 illustrates plots in an IQ plane, in accordance with disclosed embodiments of the present disclosure.

FIG. 11 illustrates an IQ imbalance compensator 1100 (which may correspond to IQ equalizer 710) inserted in the data path before the IQ modulator (e.g., IQ modulator 750). The IQ imbalance compensator 1100 may adjust the I path phase by $-\phi$ and may adjust Q path gain by multiplex with a value of $Q_{gain}$. FIG. 12 illustrates plots 1200 and 1205 in the IQ plane. In the IQ plane, these adjustments are shown in plot 1200. Since the I signal gain is not changed, but rather kept as $1 \cdot \cos(\omega_0 t)$, it may be replaced with the $Q_{gain}$ rotated right side 90° as shown in plot 1205. The new plot 1300 may make an orthogonal axis of $Q_{gain}$ and $I_{phase}$. Now, the relative level of image signal to SSB signal may be checked, where:

Image ($\omega_C t - \omega_0 t$) Signal Amplitude relative to SSB Level =

$$\sqrt{\left(\frac{Q_{gain} - 1}{Q_{gain} + 1}\right)^2 + \left(\tan\left(\frac{\varphi}{2}\right)\right)^2}$$

Figure 13:
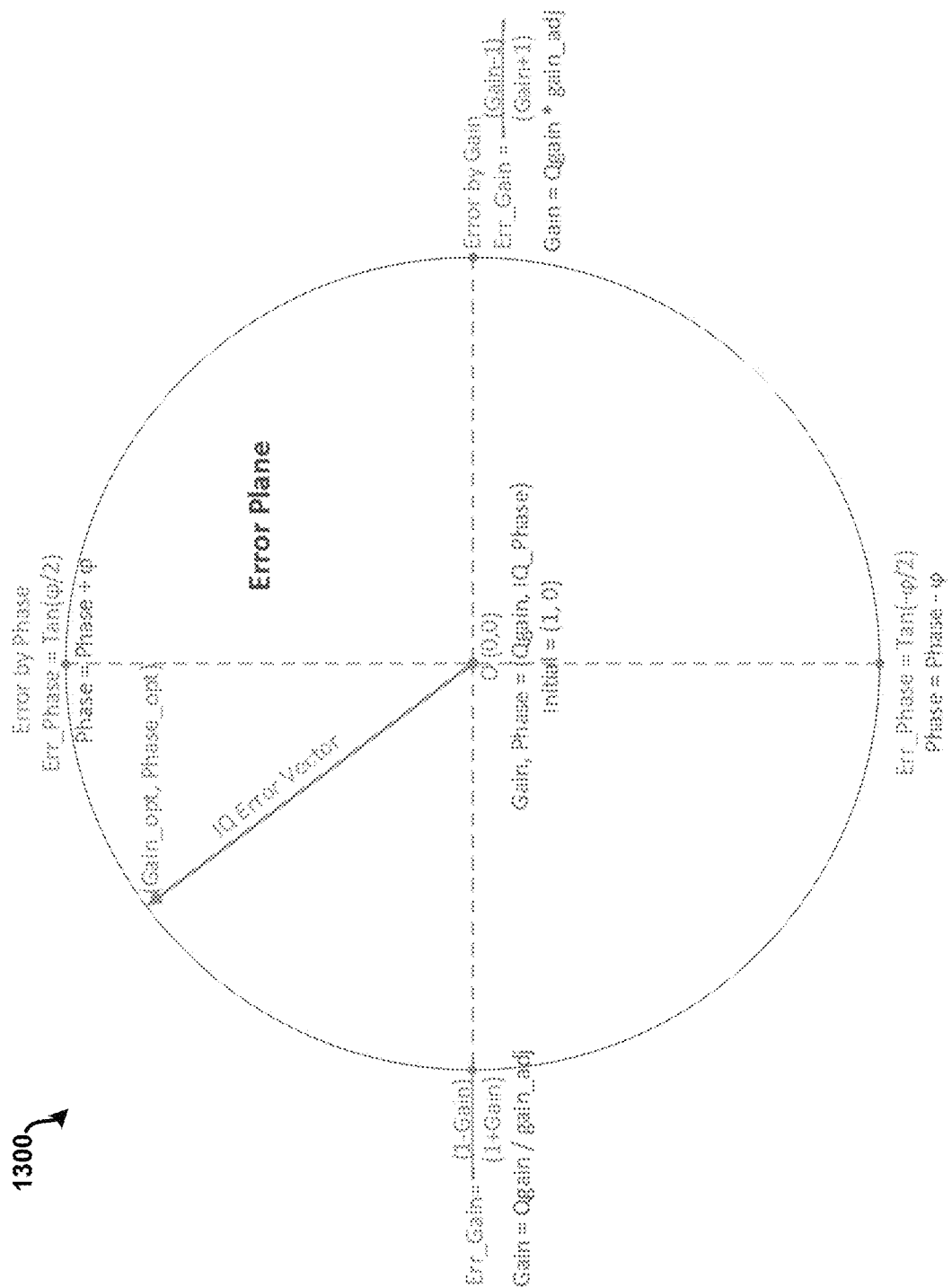
FIG. 13 illustrates a plot that includes an error plane, in accordance with disclosed embodiments of the present disclosure.

An error plane may be constructed with two orthogonal factors: x-axis as Error caused by Gain Imbalance, and y-axis as Error by Phase Offset (noted as Err_Gain and Err_Phase respectively). FIG. 13 illustrates a plot 1300 that includes the error plane. The circle in the error plane may represent a set of error components which make the same level of IQ imbalance, which may be shown on the spectrum analyzer the same relative image level (dBc). The corresponding $Q_{gain}$ and phase are shown in the plot 1300.

To find the optimum compensation point ($Q_{gain\_opt}$, $I_{phase\_opt}$), the IQ imbalance compensator may, for example, be configured to pick the following 4 points and measure the relative image level to SSB.

| # | Igain | Qgain (linear) | IQ_Phase (deg) | Measure (dBc) |
|---|---|---|---|---|
| 1 | 1 | Qgain * Gain_only | IQ_Phase | Image_Level_Gain1 |
| 2 | 1 | Qgain/Gain_only | IQ_Phase | Image_Level_Gain2 |
| 3 | 1 | Qgain | IQ_Phase + Phase_only | Image_Level_Phase1 |
| 4 | 1 | Qgain | IQ_Phase − Phase_only | Image_Level_Phase2 |

Figure 14:
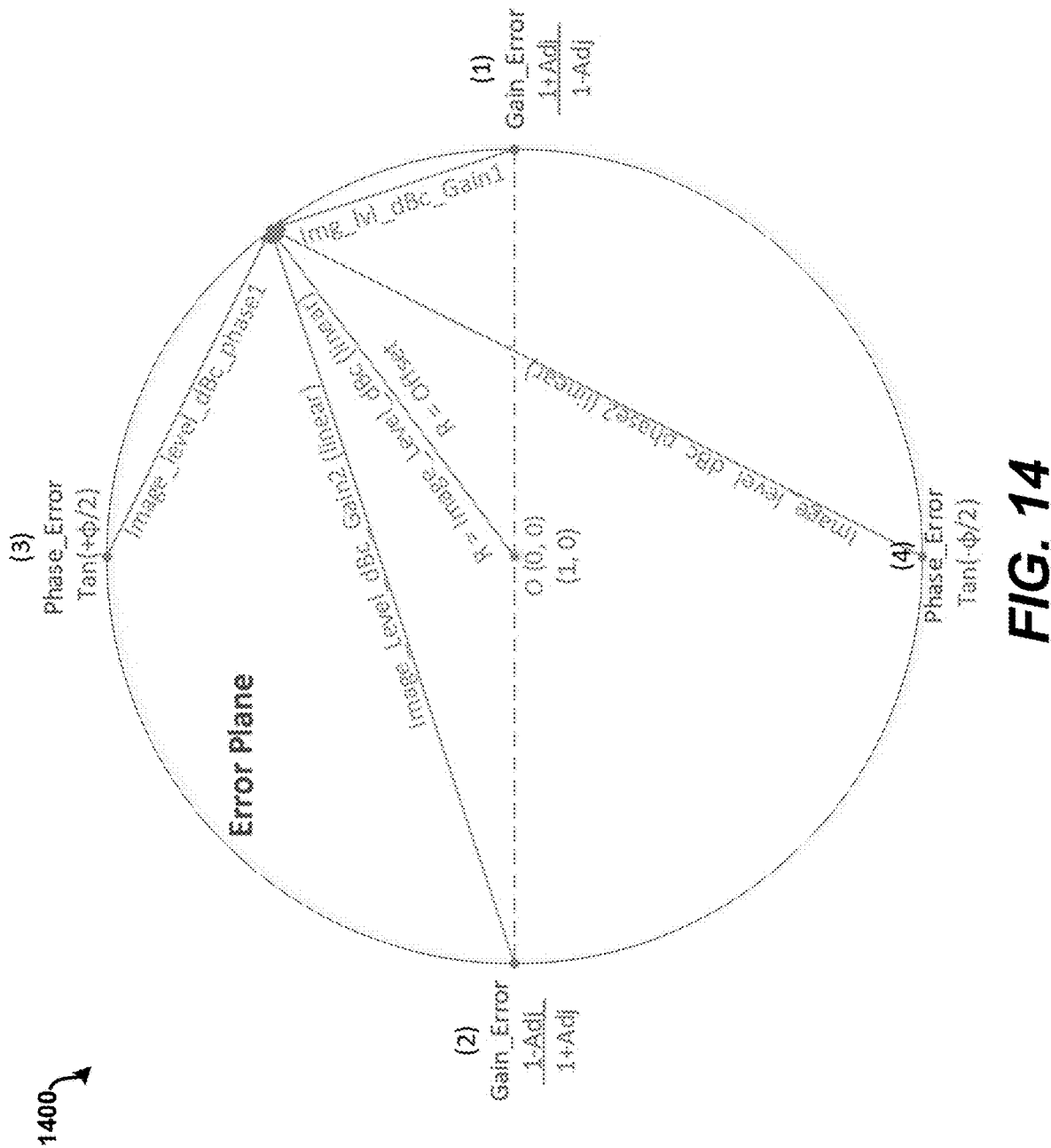
FIG. 14 illustrates an example plot of error vectors, in accordance with disclosed embodiments of the present disclosure.

FIG. 14 illustrates an example plot 1400 of the error vectors. With current Igain, Qgain, and IQ phase value (first time with initial value of unit gain to I and Q, phase_error=0), applied with the IQ imbalance compensator, the SSB signal level and Image Level may be tested on the spectrum analyzer to observe:

Image_level_dBc=Image_Level_(dBm)−SSB_Level_ (dBm)

That may be converted to linear as:

$$R = \text{Error\_Vector\_Amp} = 10^{\frac{\text{Image\_level\_dBc}}{20}}$$

Figure 15:
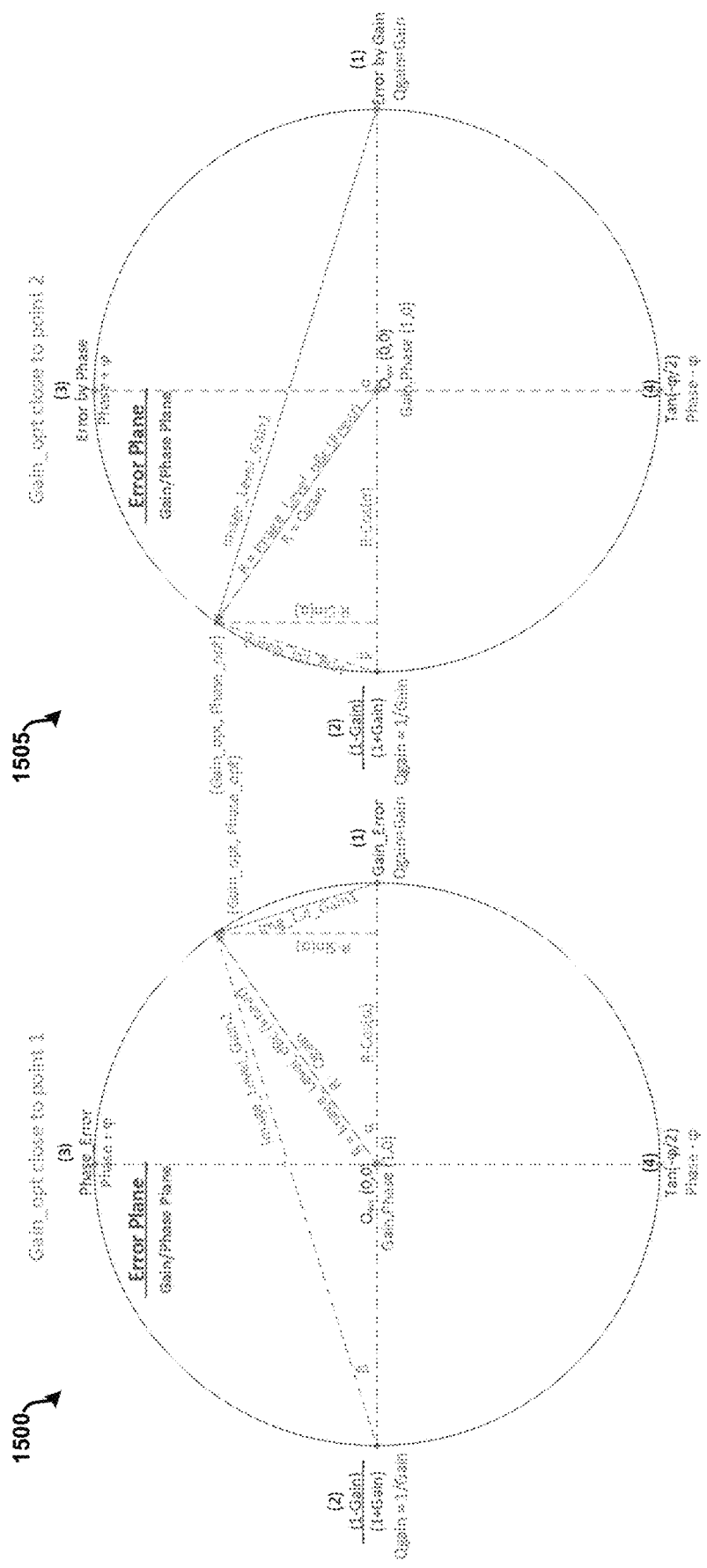
FIG. 15 illustrates example plots to find an error component caused by gain, in accordance with disclosed embodiments of the present disclosure.

To find the error component caused by gain, point 1 and point 2 may be tested. FIG. 15 illustrates corresponding plots 1500 and 1505. The following equations may be used in conjunction with the plots to determine the error component:

$$\tan(\beta) = \frac{\text{Image\_level\_gain1(linear)}}{\text{Image\_level\_gain2(linear)}}$$

$$\sin(\beta) = \frac{\text{Image\_level\_gain1(linear)}}{2 * \text{Image\_level\_dBc(linear)}}$$

$$\alpha = 2 * \beta$$

$$\text{Error\_by\_Gain} = R^* \cos(\alpha)$$

$$\text{Gain\_adj} = \frac{1 - \text{Error\_by\_Gain}}{1 + \text{Error\_by\_Gain}}$$

Using both side Gain Adjust points, the $\tan(\beta)$ formula may be used. To save test time, the test points may be reduced, only using point 1 and known R to calculate $\sin(\beta)$. If any measurement error causes the $\sin(\beta) > 1$, the operations may switch to point 2, which will give a relatively small error vector in that case.

Figure 16:
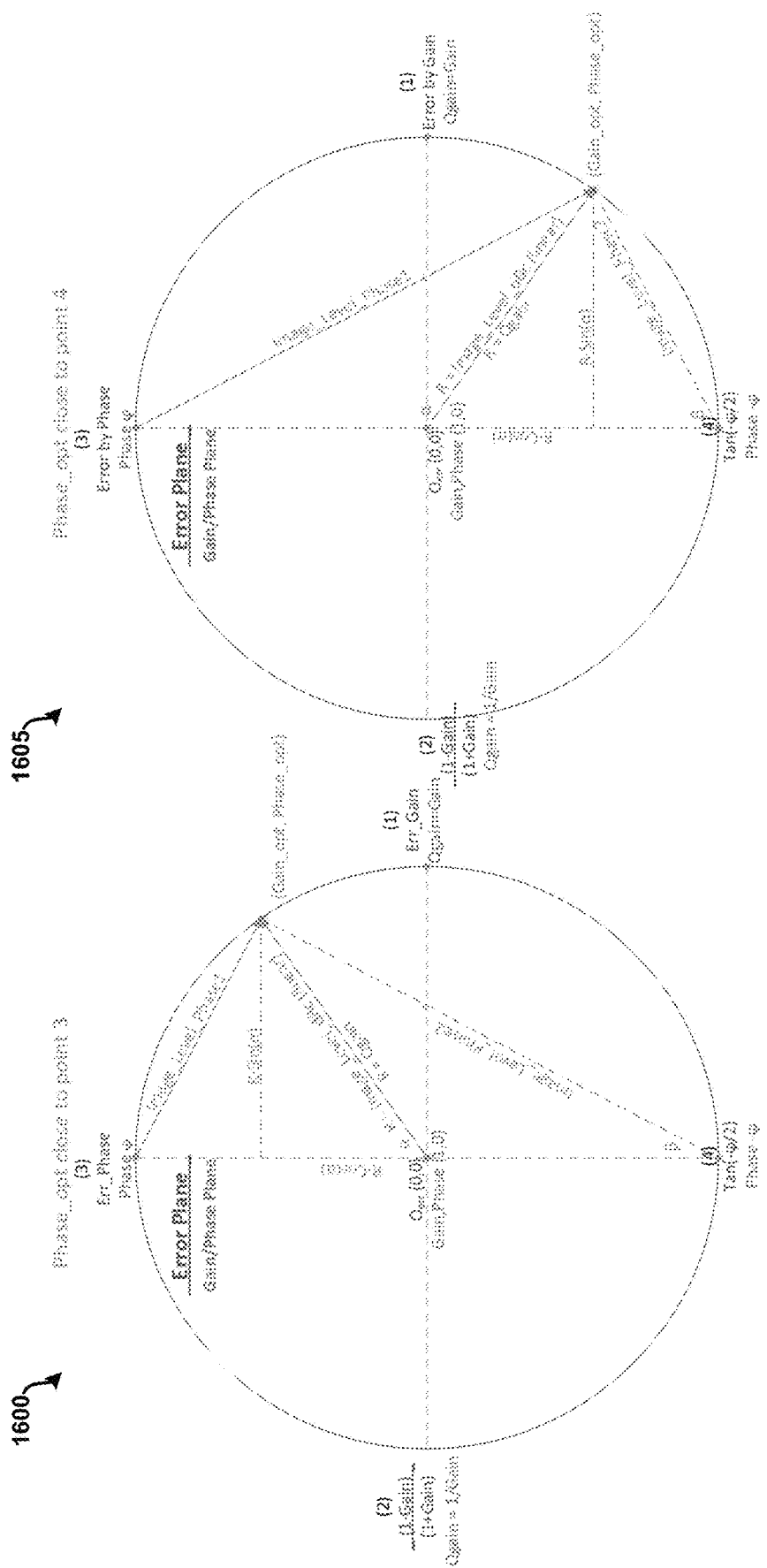
FIG. 16 illustrates example plots to calculate phase adjustment, in accordance with disclosed embodiments of the present disclosure.

Similarly, point 3 and point 4 may be used to calculate the Phase_adj. FIG. 16 illustrates corresponding plots 1600 and 1605. The following equations may be used in conjunction with the plots to determine the Phase_adj:

$$\tan(\beta) = \frac{\text{Image\_level\_phase1(linear)}}{\text{Image\_level\_phase2(linear)}}$$

$$\sin(\beta) = \frac{\text{Image\_level\_phase1(linear)}}{2 * \text{Image\_level\_dBc(linear)}}$$

$$\alpha = 2 * \beta$$

$$\text{Error\_by\_Phase} = R^* \cos(\alpha)$$

$$\text{Phase\_adj} = \frac{360}{\pi} * \text{atan}(\text{Error\_by\_Phase})$$

The compensation parameters may be updated with the found new adjustments:

Q_gain=Q_gain*Gain_adj

IQ_Phase=IQ_Phase+Phase_adj

Then, the new image level may be measured in dBc. If it is still higher than a particular limit (e.g., a threshold), the same searching method may be repeated to reach a lower level. By repeating searching (e.g., four rounds of searching or less), this process may make a poor image rejection of −30 dBc compensated to reach −90 dBc.

Figure 17:
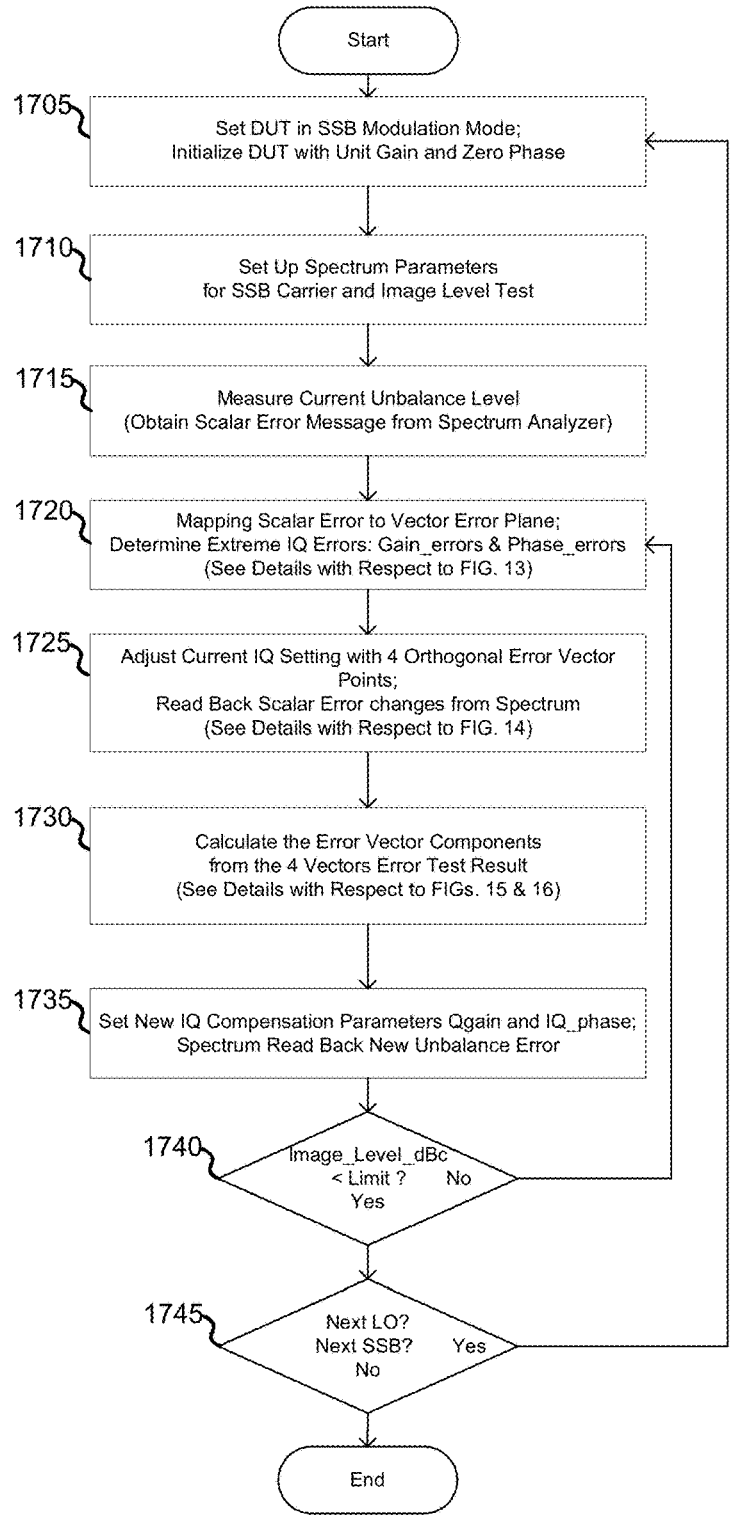
FIG. 17 illustrates a method for certain features directed to using four points, in accordance with disclosed embodiments of the present disclosure.
Figure 18:
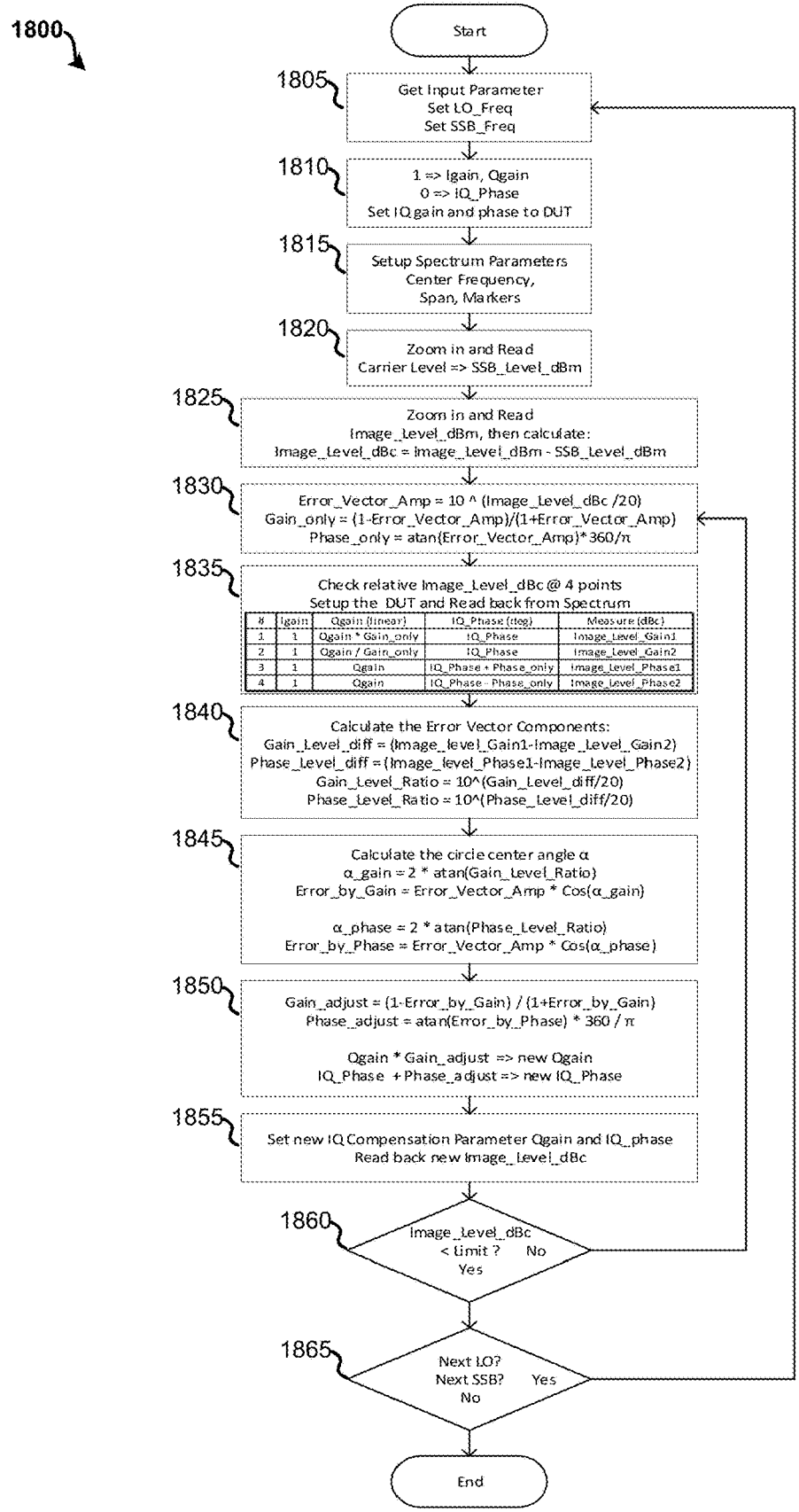
FIG. 18 illustrates a method for certain features directed to using four points, in accordance with disclosed embodiments of the present disclosure.
Figure 19:
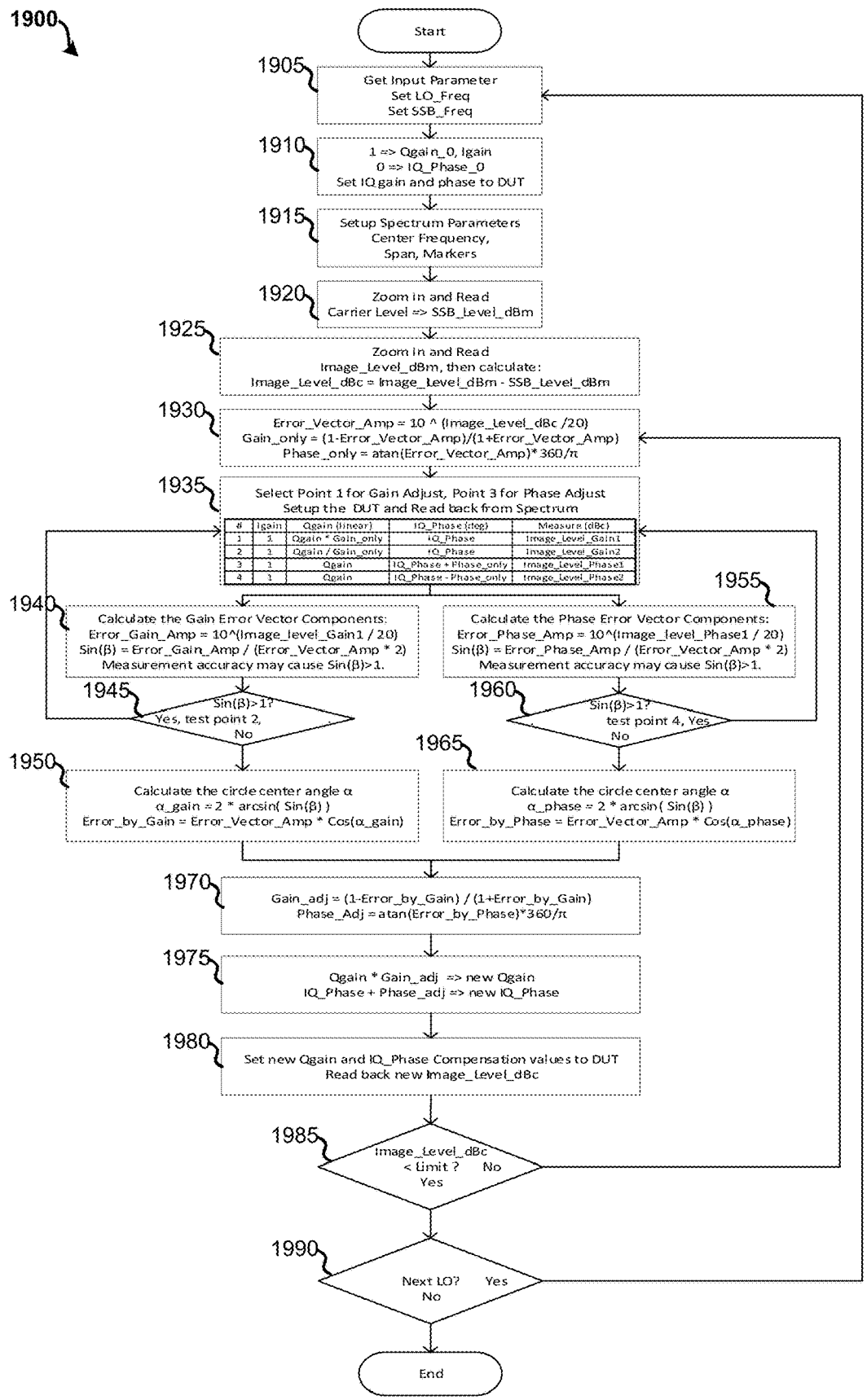
FIG. 19 illustrates an embodiment of a method for certain features directed to using two points, in accordance with disclosed embodiments of the present disclosure.

Based on the above, various methods may be performed by the communication system 102. For a wideband communication system, the electrical device, such as a DAC, modulator, mixer, amplifier, filters, etc., may cause relatively large variations across the frequency band. The amplitude and phase imbalance need to be measure in multiple points across the band. For example, a 500 MHz wideband channel may be sampled with 128 points. For each point, the amplitude and phase imbalance may be measured, then the measurements may be forwarded to software (e.g., the IQ equalizer 710, the data pattern engine 715, or another module of the system 102) executed by one or more processing devices (e.g., FGPA 705, processor 2010, and/or the like) to calculate the whole-band equalizer coefficients, which may be more than 33 pairs. To get the 128-points imbalance data, the measurement processing according to disclosed embodiments may be both accurate and fast. For example, various methods to facilitate image rejection for a radio frequency signal with a wideband carrier may be performed by the communication system 102. FIG. 17 illustrates an embodiment of a method 1700 for certain features directed to using a search engine which measures the IQ modulation error with a 4-points error vector, which may be very stable to give accurate results, in accordance with some example embodiments according to the present disclosure. FIG. 18 illustrates an embodiment of a method 1800 for certain features directed to using all four points, which method 1800 may be a more detailed embodiment corresponding to method 1700, in accordance with some example embodiments according to the present disclosure. FIG. 19 illustrates an embodiment of a method 1900 for certain features directed to using only two trying points to reduce the test time, in accordance with some example embodiments according to the present disclosure. Accordingly, FIG. 17 may illustrate a summary, whereas FIGS. 18 and 19 may illustrate two detailed implementations-method 1800 may target achieving greater stability, and method 1900 may target achieving greater speed.

However, teachings of the present disclosure may be implemented in a variety of configurations. As such, the order of the steps comprising the method 1700 and/or other methods, processes, and operations disclosed herein may be shuffled or combined in any suitable manner and may depend on the implementation chosen. Moreover, while the steps disclosed herein may be separated for the sake of description, it should be understood that certain steps may be performed simultaneously or substantially simultaneously.

In various embodiments, the operations of method 1700 and/or other methods, processes, and operations disclosed herein may be performed by one or more devices corresponding to the communication system 102, the modulator and transmitter 210, components thereof, and/or the like devices configured for use in wideband RF communications. Referring to FIG. 17, the method 1700 may begin with setting the device under test in SSB modulation mode, as indicated by block 1705. The device may be initialized with unit gain and zero phase. As indicated by block 1710, spectrum parameters may be set up for a particular SSB carrier and image level test.

As indicated by block 1715, a current imbalance level may be measured. This may include obtaining a scalar error message from the spectrum analyzer. As indicated by block 1720, the scalar error may be mapped to a vector error plane as in the plot 1300. Extreme IQ errors may be determined, as described in detail above with respect to FIG. 11. This may include gain errors and/or phase errors. As indicated by block 1725, a current IQ setting may be adjusted with four orthogonal error vector points. Four new scalar error with the applied extreme error vectors may be read back from the spectrum. As indicated by block 1730, error vector components may be calculated from the four vectors error test results. As indicated by block 1735, new IQ compensation parameters may be set. For example, Qgain and IQ_phase may be set. A new imbalance error may be read back from the spectrum.

As indicated by block 1740, it may be determined whether the Image_Level_dB is less than the predetermined limit. If the Image_Level_dB is not less than the predetermined limit, then flow may transition back to block 1720. If the Image_Level_dB is less than the predetermined limit, the flow may transition to block 1745, this finishes a SSB point imbalance data measurement. As indicated by block 1745, it may be determined whether there is a next SSB point to measure or the whole band is finished and move to a next band with a different LO frequency to process. If so, then flow may transition back to block 1705. Otherwise, the method 1700 may end.

Referring to FIG. 18, the method 1800 may begin with getting and/or setting input parameters, such as setting the LO frequency and the SSB frequency, as indicated by block 1805. As indicated by block 1810, the IQ gain and phase may be set. As indicated by block 1815, the spectrum parameters, center frequency, span, markers, and/or the like may be set. As indicated by block 1820, the carrier level=>SSB_Level_dBm may be read. As indicated by block 1825, the Image_Level_dBm may be read, and the Image_Level_dBc may be calculated. As indicated by block 1830, the Error_Vector_Amp, Gain_only, and Phase_only may be determined.

The relative Image_Level_dBc at four points may be checked the device under test may be set up, and the spectrum may be read, as indicated by block 1835. As indicated by block 1840, the error vector components may be calculated. As indicated by block 1845, the circle center angle may be calculated. As indicated by block 1850, the Gain adjust and Phase_adjust may be determined, and a new Qgain and a new IQ_Phase may be obtained. As indicated by block 1855, a new IQ compensation parameter Qgain and IQ_phase may be set, and the new Image_Level_dBc may be read. As indicated by block 1860, it may be determined whether the Image_Level_dB is less than the predetermined limit. If the Image_Level_dB is not less than the predetermined limit, then flow may transition back to block 1830. If the Image_Level_dB is less than the predetermined limit, the flow may transition to block 1865. As indicated by block 1865, it may be determined whether there is a next LO and/or a next SSB to process. If so, then flow may transition back to block 1805. Otherwise, the method 1800 may end.

Referring to FIG. 19, the method 1900 may begin with getting and/or setting input parameters, such as setting the LO frequency and the SSB frequency, as indicated by block 1905. As indicated by block 1910, the IQ gain and phase may be set. As indicated by block 1915, the spectrum parameters, center frequency, span, markers, and/or the like may be set. As indicated by block 1920, the carrier level=>SSB_Level_dBm may be read. As indicated by block 1925, the Image_Level_dBm may be read, and the Image_Level_dBc may be calculated. As indicated by block 1930, the Error_Vector_Amp, Gain_only, and Phase_only may be determined.

Point 1 may be selected for gain adjust, point 3 may be selected for phase adjust, the device under test may be set up, and the spectrum may be read, as indicated by block 1935. As indicated by block 1940, the error vector components may be calculated, and then it may be determined whether $\sin(\beta) > 1$ with respect to test point 2, as indicated by block 1945. If $\sin(\beta) > 1$, then the flow may transition back to block 1935. If not, the flow may transition to block 1950, and then the circle center angle may be calculated, as indicated by block 1950. As indicated by block 1955, the error vector components may be calculated, and then, with respect to point 4, it may be determined whether $\sin(\beta) > 1$, as indicated by block 1960. If $\sin(\beta) > 1$, then the flow may transition back to block 1935. If not, the flow may transition to block 1965, and then the circle center angle may be calculated, as indicated by block 1965.

As indicated by block 1970, the Gain adjust and Phase_adjust may be determined. As indicated by block 1975, a new Qgain and a new IQ_Phase may be obtained. As indicated by block 1980, the new Qgain and IQ_Phase compensation values may be set with respect to the device under test, and the new Image_Level_dBc may be read. As indicated by block 1985, it may be determined whether the Image_Level_dB is less than the predetermined limit. If the Image_Level_dB is not less than the predetermined limit, then flow may transition back to block 1930. If the Image_Level_dB is less than the predetermined limit, the flow may transition to block 1990. As indicated by block 1990, it may be determined whether there is a next to process. If so, then flow may transition back to block 1905. Otherwise, the method 1900 may end.

Thus, such methods and features may be used to facilitate IQ modulation image rejection in various embodiments of the communication system 102 and/or components thereof. For example, the wideband IQ modulator and transmitter 210 may be configured to use such methods and features to facilitate IQ modulation image rejection. In some embodiments, the communication system 102, modulator and transmitter 210, and/or components thereof may be configured to perform IQ modulation image rejection automatically.

Figure 20:
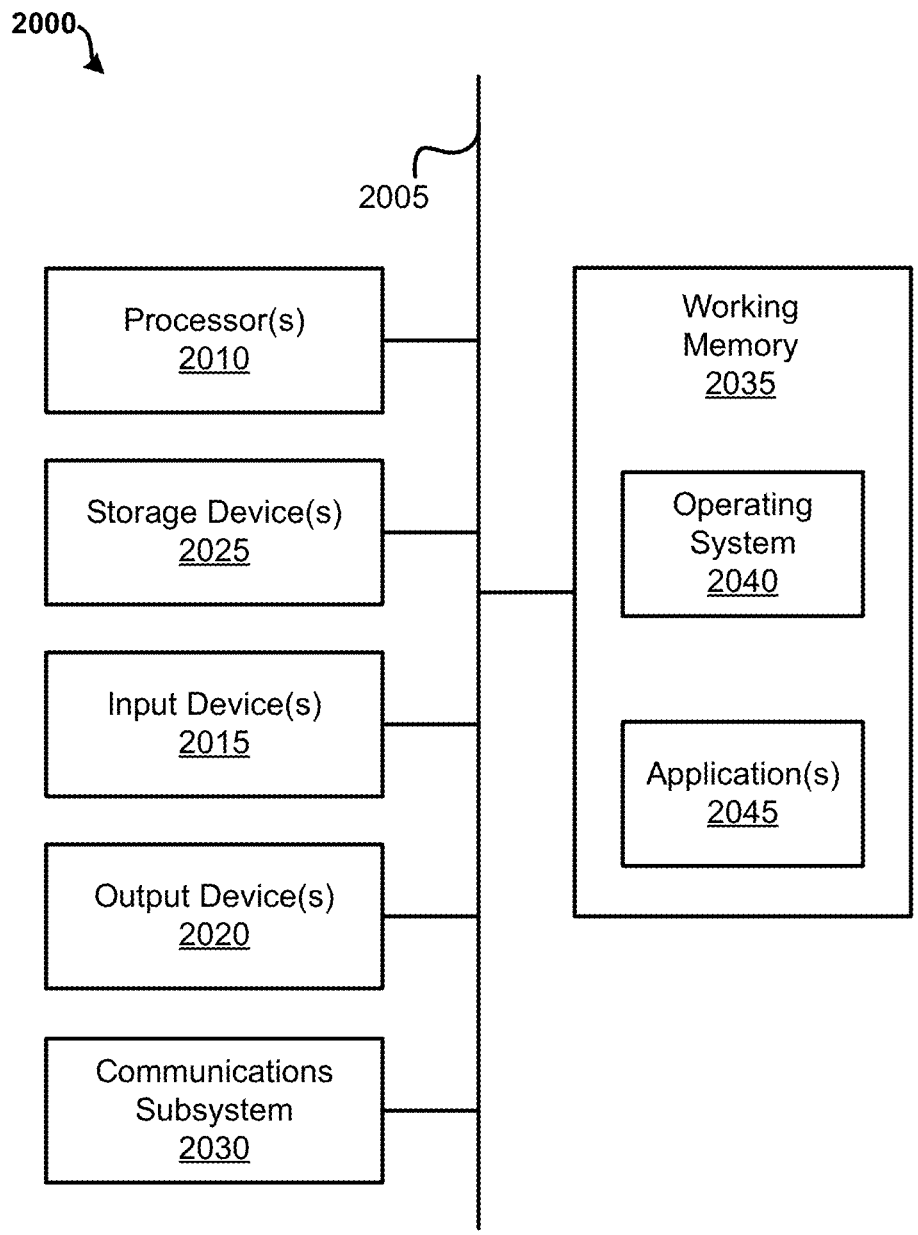
FIG. 20 provides a schematic illustration of one embodiment of a computer system that can implement various system components and/or perform various steps of methods, in accordance with disclosed embodiments of the present disclosure.

Embodiments of the communication system 102, the modulator and transmitter 210, test computing device 410, components thereof, and/or the like devices configured for use in wideband RF communications may be implemented on, and/or can incorporate, one or more computer systems, as illustrated in FIG. 20. FIG. 20 provides a schematic illustration of one embodiment of a computer system 2000 that can implement various system components and/or perform various steps of methods provided by various embodiments. It should be noted that FIG. 20 is meant only to provide a generalized illustration of various components, any or all of which may be utilized as appropriate. FIG. 20, therefore, broadly illustrates how individual system elements may be implemented in a relatively separated or relatively more integrated manner. The computer system 2000 is shown including hardware elements that can be electrically coupled via a bus 2005 (or may otherwise be in communication, as appropriate). The hardware elements may include one or more processors 2010, including, without limitation, one or more general-purpose processors and/or one or more special-purpose processors (such as digital signal processing chips, graphics acceleration processors, video decoders, and/or the like). As illustrated, some embodiments include one or more input devices 2015 and/or output devices 2020. The computer system 2000 is configured to interface with additional computers, such that the input devices 2015 and/or output devices 2020 include various physical and/or logical interfaces (e.g., ports, etc.) to facilitate computer-to-computer interaction and control.

The computer system 2000 may further include (and/or be in communication with) one or more non-transitory storage devices 2025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 2025 include the non-transient memory.

The computer system 2000 can also include a communications subsystem 2030, which can include, without limitation, any suitable antennas, transceivers, modems, network cards (wireless or wired), infrared communication devices, wireless communication devices, chipsets (such as a Bluetooth™ device, an 802.11 device, a Wi-Fi device, a WiMAX device, cellular communication device, etc.), and/or other communication components. As illustrated, the communications subsystem 2030 generally includes any suitable components for facilitating communications of the communication system 102, the modulator and transmitter 210, components thereof, and/or the like devices configured for use in wideband RF communications.

In many embodiments, the computer system 2000 will further include a working memory 2035, which can include a RAM or ROM device, as described herein. The computer system 2000 also can include software elements, shown as currently being located within the working memory 2035, including an operating system 2040, device drivers, executable libraries, and/or other code, such as one or more application programs 2045, which may include computer programs provided by various embodiments, and/or may be designed to implement methods, and/or configure systems, provided by other embodiments, as described herein. The executable libraries and/or other code may include, for example, test suite software such as LabVIEW, C++, Python code, and/or the like, and the test software may include four parts (e.g., test equipment driver(s), LAN communication section(s), test data collecting, and data processing and output), which code may use a different part(s) or module(s) in the computer system 2000 to perform the whole test procedures. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (and/or other devices such as test equipment that includes the spectrum analyzer, which may include a built-in computer) to perform one or more operations in accordance with the described methods.

In some embodiments, the operating system 2040 and the working memory 2035 are used in conjunction with the one or more processors 2010 to implement features of the communication system 102, the modulator and transmitter 210, components thereof, and/or the like devices configured for use in wideband RF communications. Embodiments of the one or more processors 2010 can implement one or methods executed by the communication system 102, the modulator and transmitter 210, components thereof, and/or the like devices, such that the operating system 2040 and the working memory 2035 can implement features of the communication system 102, the modulator and transmitter 210, components thereof, and/or the like devices. In some embodiments, the working memory 2035 includes non-transient, processor-readable memory having instructions stored thereon, which, when executed, cause the one or more processors 2010 to perform steps including: analyzing one or more wideband signals from a device, where the one or more wideband signals correspond to a wideband channel, each wideband signal of the one or more wideband signals corresponds to a sinusoidal electrical signal with angle modulation, and the analyzing comprises: determining an in-phase component (I) of at least one wideband signal of the one or more wideband signals; determining a quadrature component (Q) of the at least one wideband signal; based at least in part on the determined I and Q, determining a wideband IQ imbalance of the at least one wideband signal; obtaining a scalar error based at least in part on the wideband IQ imbalance; mapping the scalar error to a vector error plane; determining orthogonal error vector points that are based at least in part on the mapping; and compensating for the wideband IQ imbalance of the device based at least in part on adjusting an IQ setting of the device with the orthogonal error vector points.

A set of these instructions and/or codes can be stored on a non-transitory computer-readable storage medium, such as the non-transitory storage device(s) 2025 described above. In some cases, the storage medium can be incorporated within a computer system, such as computer system 2000. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computer system 2000 and/or can take the form of source and/or installable code, which, upon compilation and/or installation on the computer system 2000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. In some embodiments, for example with respect to the test setup of FIG. 4, the device under test (DUT) may correspond to the wideband communication system and may be an example of the customized hardware, with customized portable software built into the DUT. Further, connection to other computing devices, such as network input/output devices, may be employed.

As mentioned above, in one aspect, some embodiments may employ a computer system (such as the computer system 2000) to perform methods in accordance with various embodiments of the disclosure. According to a set of embodiments, some or all of the procedures of such methods are performed by the computer system 2000 in response to processor 2010 executing one or more sequences of one or more instructions (which can be incorporated into the operating system 2040 and/or other code, such as an application program 2045) contained in the working memory 2035. Such instructions may be read into the working memory 2035 from another computer-readable medium, such as one or more of the non-transitory storage device(s) 2025. Merely by way of example, execution of the sequences of instructions contained in the working memory 2035 can cause the processor(s) 2010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 2000, various computer-readable media can be involved in providing instructions/code to processor(s) 2010 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 2025. Volatile media include, without limitation, dynamic memory, such as the working memory 2035. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 2010 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 2000. The communications subsystem 2030 (and/or components thereof) generally will receive signals, and the bus 2005 then can carry the signals (and/or the data, instructions, etc., carried by the signals) to the working memory 2035, from which the processor(s) 2010 retrieves and executes the instructions. The instructions received by the working memory 2035 may optionally be stored on a non-transitory storage device 2025 either before or after execution by the processor(s) 2010.

It should further be understood that the components of computer system 2000 can be distributed across a network. For example, some processing may be performed in one location using a first processor while other processing may be performed by another processor remote from the first processor. By way of example, in some embodiments, the test controller device 410 and the spectrum analyzer 405 may be independent computer systems that may be communicatively connected through a LAN Network, may be configured to support LAN based-test software, and may be configured to work together to perform the test measurement methods with automation software code. Other components of computer system 2000 may be similarly distributed. As such, computer system 2000 may be interpreted as a distributed computing system that performs processing in multiple locations. In some instances, computer system 2000 may be interpreted as a single computing device.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device to facilitate image rejection for a radio frequency signal with a wideband carrier, the device comprising:
   one or more processing devices; and
   memory communicatively coupled with and readable by the one or more processing devices and having stored therein processor-readable instructions which, when executed by the one or more processing devices, cause the one or more processing devices to perform operations comprising:
      analyzing one or more wideband signals from a device, where:
         the one or more wideband signals correspond to a wideband channel;
         each wideband signal of the one or more wideband signals corresponds to a sinusoidal electrical signal with IQ amplitude and phase modulation; and
         the analyzing comprises:
            determining an in-phase component (I) of at least one wideband signal of the one or more wideband signals;
            determining a quadrature component (Q) of the at least one wideband signal;
            based at least in part on the determined I and Q, determining a wideband IQ imbalance of the at least one wideband signal;
            obtaining a scalar error based at least in part on the wideband IQ imbalance;
            mapping the scalar error to a vector error plane;
            determining orthogonal error vector points that are based at least in part on the mapping; and
      compensating for the wideband IQ imbalance of the device based at least in part on adjusting an IQ setting of the device with the orthogonal error vector points.

2. The device to facilitate image rejection for a radio frequency signal with a wideband carrier as recited in claim 1, where the orthogonal error vector points are four orthogonal error vector points.

3. The device to facilitate image rejection for a radio frequency signal with a wideband carrier as recited in claim 1, where the orthogonal error vector points are two orthogonal error vector points.

4. The device to facilitate image rejection for a radio frequency signal with a wideband carrier as recited in claim 1, where the mapping the scalar error to the vector error plane comprises determining extreme IQ errors.

5. The device to facilitate image rejection for a radio frequency signal with a wideband carrier as recited in claim 4, where the extreme IQ errors comprise one or more gain errors and/or one or more phase errors.

6. The device to facilitate image rejection for a radio frequency signal with a wideband carrier as recited in claim 1, the operations further comprising:
   calculating error vector components based at least in part on the orthogonal error vector points;
   determining one or more IQ compensation parameters based at least in part on the error vector components;
   where the compensating for the wideband IQ imbalance is based at least in part on the one or more IQ compensation parameters.

7. The device to facilitate image rejection for a radio frequency signal with a wideband carrier as recited in claim 1, where the determining the wideband IQ imbalance of the at least one wideband signal comprises:
   determining an IQ imbalance at a center frequency of the at least one wideband signal; and
   determining an IQ imbalance at one or more edge frequencies of the at least one wideband signal.

8. The device to facilitate image rejection for a radio frequency signal with a wideband carrier as recited in claim 1, the operations further comprising:
   modulating the at least one wideband signal to convert to a radio frequency domain; and
   determining modulator performance metrics.

9. The device to facilitate image rejection for a radio frequency signal with a wideband carrier as recited in claim 1, where the determining the wideband IQ imbalance of the at least one wideband signal corresponds to measuring IQ balance across an entire bandwidth of the at least one wideband signal.

10. The device to facilitate image rejection for a radio frequency signal with a wideband carrier as recited in claim 1, the operations further comprising:
    deriving equalization coefficients; and
    where the compensating for the wideband IQ imbalance of the device comprises using the equalization coefficients to correct the wideband channel, the correcting the wideband channel comprising reducing imaging of the channel.

11. The device to facilitate image rejection for a radio frequency signal with a wideband carrier as recited in claim 1, the operations further comprising:
    based at least in part on the compensating for the wideband IQ imbalance of the device, equalizing the wideband channel so that broadband and narrowband are equalized by way of the wideband channel being equalized, where the wideband channel is an ultra-wideband channel.

12. A method to facilitate image rejection for a radio frequency signal with a wideband carrier, the method comprising:
analyzing one or more wideband signals from a device, where:
the one or more wideband signals correspond to a wideband channel;
each wideband signal of the one or more wideband signals corresponds to a sinusoidal electrical signal with IQ amplitude and phase modulation; and
the analyzing comprises:
determining an in-phase component (I) of at least one wideband signal of the one or more wideband signals;
determining a quadrature component (Q) of the at least one wideband signal;
based at least in part on the determined I and Q, determining a wideband IQ imbalance of the at least one wideband signal;
obtaining a scalar error based at least in part on the wideband IQ imbalance;
mapping the scalar error to a vector error plane;
determining orthogonal error vector points that are based at least in part on the mapping; and
compensating for the wideband IQ imbalance of the device based at least in part on adjusting an IQ setting of the device with the orthogonal error vector points.

13. The method to facilitate image rejection for a radio frequency signal with a wideband carrier as recited in claim 12, where the orthogonal error vector points are four orthogonal error vector points.

14. The method to facilitate image rejection for a radio frequency signal with a wideband carrier as recited in claim 12, where the orthogonal error vector points are two orthogonal error vector points.

15. The method to facilitate image rejection for a radio frequency signal with a wideband carrier as recited in claim 12, where the mapping the scalar error to the vector error plane comprises determining extreme IQ errors.

16. The method to facilitate image rejection for a radio frequency signal with a wideband carrier as recited in claim 15, where the extreme IQ errors comprise one or more gain errors and/or one or more phase errors.

17. One or more non-transitory, machine-readable media having machine-readable instructions thereon which, when executed by one or more processing devices, cause the one or more processing devices to perform operations comprising:
analyzing one or more wideband signals from a device, where:
the one or more wideband signals correspond to a wideband channel;
each wideband signal of the one or more wideband signals corresponds to a sinusoidal electrical signal with IQ amplitude and phase modulation; and
the analyzing comprises:
determining an in-phase component (I) of at least one wideband signal of the one or more wideband signals;
determining a quadrature component (Q) of the at least one wideband signal;
based at least in part on the determined I and Q, determining a wideband IQ imbalance of the at least one wideband signal;
obtaining a scalar error based at least in part on the wideband IQ imbalance;
mapping the scalar error to a vector error plane;
determining orthogonal error vector points that are based at least in part on the mapping; and
compensating for the wideband IQ imbalance of the device based at least in part on adjusting an IQ setting of the device with the orthogonal error vector points.

18. The one or more non-transitory, machine-readable media as recited in claim 17, where the orthogonal error vector points are four orthogonal error vector points.

19. The one or more non-transitory, machine-readable media as recited in claim 17, where the orthogonal error vector points are two orthogonal error vector points.

20. The one or more non-transitory, machine-readable media as recited in claim 17, where the mapping the scalar error to the vector error plane comprises determining extreme IQ errors.

* * * * *